United States Patent [19]

Holender

[11] Patent Number: 5,764,740

[45] Date of Patent: Jun. 9, 1998

[54] SYSTEM AND METHOD FOR OPTIMAL LOGICAL NETWORK CAPACITY DIMENSIONING WITH BROADBAND TRAFFIC

[75] Inventor: Wlodek Holender, Paragrafgränden, Sweden

[73] Assignee: Telefonaktiebolaget LM Ericsson, Stockholm, Sweden

[21] Appl. No.: 514,235

[22] Filed: Aug. 11, 1995

Related U.S. Application Data

[60] Provisional application No. 60/001,169, Jul. 14, 1995.

[51] Int. Cl.[6] .................................................. H04M 15/00
[52] U.S. Cl. ............................ 379/112; 379/113; 379/220; 379/229
[58] Field of Search ................................ 379/112, 113, 379/220–221, 13–14, 115, 133, 137, 219, 201, 230, 207, 229

[56] References Cited

U.S. PATENT DOCUMENTS

| | | | |
|---|---|---|---|
| 4,669,113 | 5/1987 | Ash et al. | 379/221 |
| 4,679,187 | 7/1987 | Irvin | 370/17 |
| 5,070,498 | 12/1991 | Kakuma et al. | 370/60 |
| 5,179,556 | 1/1993 | Turner | 370/94.1 |
| 5,199,027 | 3/1993 | Barri | 370/60 |
| 5,267,232 | 11/1993 | Katsube et al. | 370/17 |
| 5,271,005 | 12/1993 | Takase et al. | 370/79 |
| 5,289,303 | 2/1994 | Cloonan et al. | 359/139 |
| 5,345,444 | 9/1994 | Cloonan et al. | 370/60 |
| 5,357,507 | 10/1994 | Hughes et al. | 370/60 |
| 5,381,404 | 1/1995 | Sugano et al. | 370/13 |
| 5,430,729 | 7/1995 | Rahnema | 270/94.1 |
| 5,539,884 | 7/1996 | Robrock, II | 379/112 |
| 5,548,639 | 8/1996 | Ogura et al. | 379/221 |

FOREIGN PATENT DOCUMENTS

| | | |
|---|---|---|
| 4-98940 | 3/1992 | Japan . |
| 4-151933 | 5/1992 | Japan . |
| 4-326836 | 11/1992 | Japan . |
| 5-114910 | 5/1993 | Japan . |
| 6-97952 | 4/1994 | Japan . |

OTHER PUBLICATIONS

T. Bauschert: "Network Engineering for ATM with Virtual Paths", Jun. 1994.

B. Lagerstedt & H. Nyman, ATM in Public Telecommunicatons Networks, Ericsson Review, No. 3, pp. 114–124 (1993).

J.P. Labourdette & G. W. Hart, Blocking Probabilities in Multitraffic Loss Systems: Insensitivity, Asymptotic Behavior, and Approximations, IEEE Transactions on Communications, vol. 40, No. 8, pp. 1355–1365 (Aug. 1992).

F. Vakil, A Capacity Allocation Rule for ATM Networks, Proceedings of Globecom '93, Houston, Texas, pp. 406–416 (IEEE 1993).

J. Blume, L. Hansson, P. Hägg & L. Sundin, Control and Operation of SDH Network Elements, Ericsson Review, No. 3, pp. 62–77 (1992).

Y. Miyao, A Dimensioning Scheme in ATM Networks, Networks '92, pp. 171–176 (May 1992).

(List continued on next page.)

*Primary Examiner*—Curtis Kuntz
*Assistant Examiner*—Binh K. Tieu
*Attorney, Agent, or Firm*—Jenkens & Gilchrist, P.C.

[57] ABSTRACT

A general dimensioning method and system for allocating limited transmission resources to virtual networks given offered traffic for virtual paths on the virtual networks. The N-layer virtual network dimensioning problem is reduced to an equivalent virtual path dimensioning problem by collapsing the top three layers of a N-level hierarchical structure to a two-layer hierarchical structure consisting of the old bottom layer and a new top layer. The new top layer comprises a plurality of virtual routes mapped on the old bottom layer. The resulting virtual route dimensioning problem can be solved using standard techniques or by using an entropy-based dimensioning algorithm to yield the optimal allocation of resources for layer N-2.

42 Claims, 23 Drawing Sheets

OTHER PUBLICATIONS

S. Ohta & Sato, Dynamic Bandwidth Control of the Virtual Path in an Asynchronous Transfer Mode Network, IEEE Transactions on Communications, vol. 40, No. 7, pp. 1239–1246 (Jul. 1992).

N.G. Duffield, J.T. Lewis, N. O'Connell, R. Russell & F. Toomey, The Entropy Of An Arrivals Process: A Tool For Estimating QoS Parameters of ATM Traffic, preprint DIAS–94–07, Dublin Institute of Advanced Studies, (Sep. 1994).

N.G. Duffield, J.T. Lewis, N. O'Connell, R. Russell & F. Toomey, Entropy of ATM Traffic Streams: A Tool for Estimating QoS Parameters, Dublin Institute for Advanced Studies (Sep. 1994).

N. T. Plotkin & P.P. Varaiya, The Entropy of Traffic Streams in ATM Virtual Circuits (IEEE 1994).

N.G. Duffield, T.T. Lewis, N. O'Connell, R. Russell & F. Toomey, Estimating QoS Parameters for ATM Traffic Using Its Entropy, preprint DIAS–APG–94–161, Dublin Institute for Advanced Studies (1994).

A. Faragó, S. Blaabjerg, L. Ast, G. Gordos & T. Henk, A New Degree of Freedom in ATM Network Dimensioning: Optimizing the Logical Configuration, IEEE Journal on Selected Areas of Communications, vol. 13, No. 7, pp. 1199–1206 (Sep. 1995).

A. Faragó, S. Blaabjerg, W. Holender, T. Henk, Á. Szentesi & Z. Ziaja, Resource Separation—an Efficient Tool for Optimizing ATM Network Configuration, Networks '94 (Sep. 1994).

B. Hajek, Performance of Global Load Balancing by Local Adjustment, IEEE Transactions on Information Theory, vol. 36, No. 6, pp. 1398–1414 (Sep. 1990).

Jiro Yamada & Akiya Inoue, Intelligent Path Assignment Control For Network Survivability and Fairness, 2 Proceedings of the IEEE International Conference on Communications (ICC'91), Denver, Colorado 667–671 (Jun. 23–26, 1991) (Document No. XP 000269580).

Joseph Y. Hui, Melike B. Gursoy, Nader Moayeri & Roy D. Yates, A Layered Broadband Switching Architecture with Physical or Virtual Path Configurations, 9 IEEE Journal on Selected Areas in Communications 1416–1426 (Dec. 1991) (Document No. XP 000267532).

Ram Krishnan & John A. Silvester, An Approach to Path-–Splitting in Multipath Networks, 3 Proceedings of the IEEE International Conference on Communications (ICC'93), Geneva, Switzerland 1353–1357 (May 23–26, 1993) (Document No. XP 000448363).

Cell header at NNI

Cell header at UNI

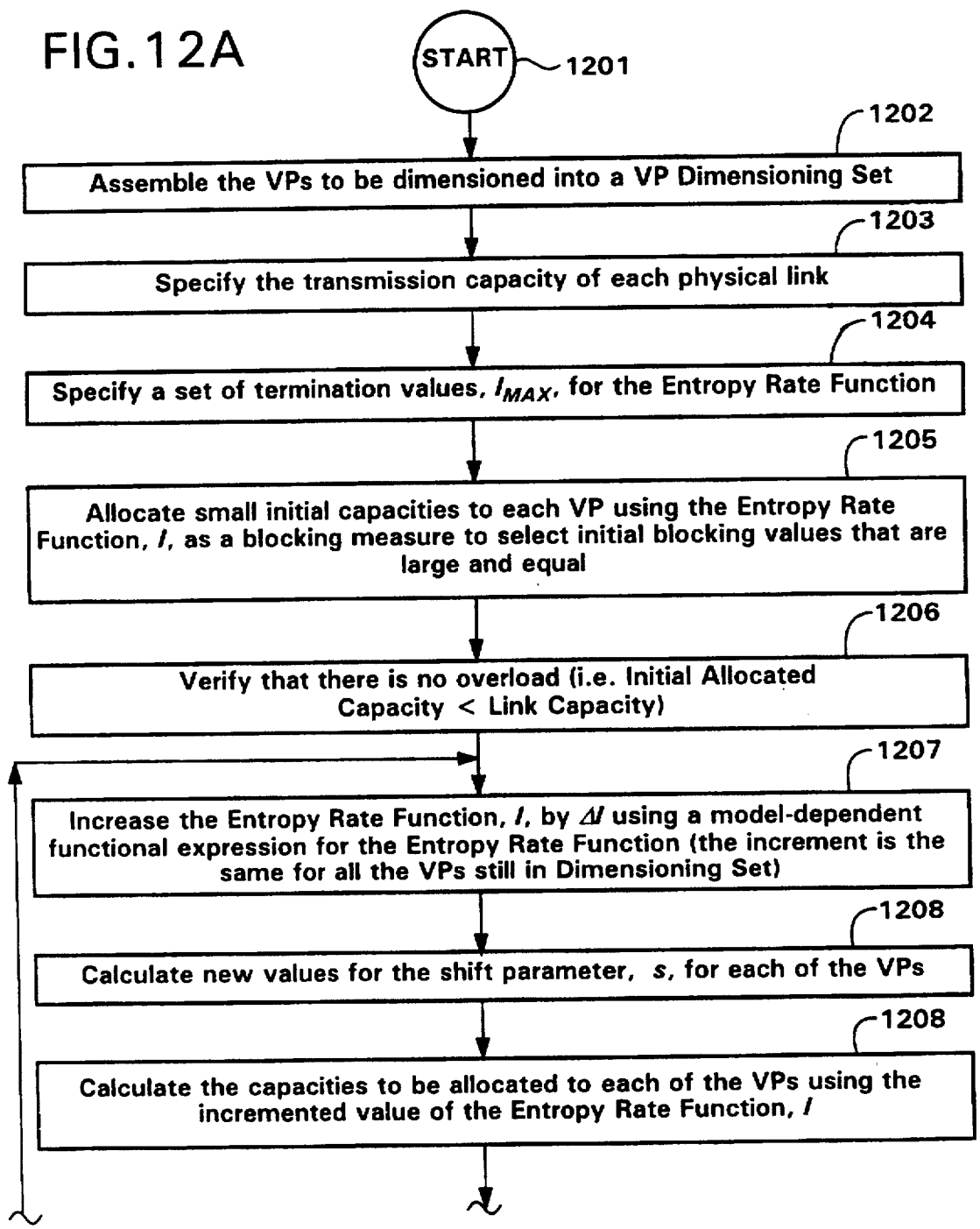

FIG.21
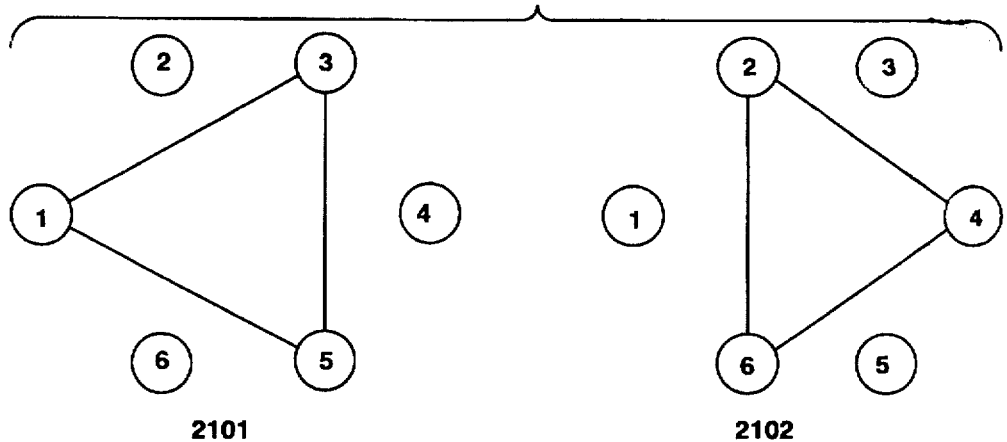
2101　　　　　　　　　　　2102
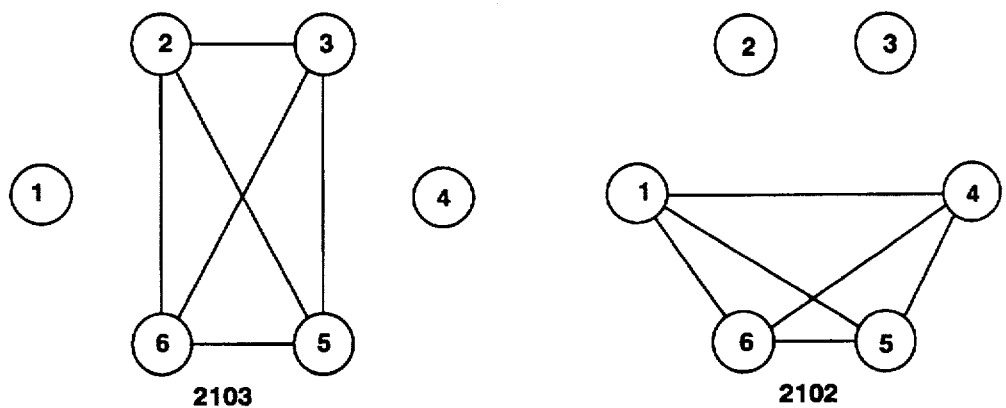
2103　　　　　　　　　　　2102
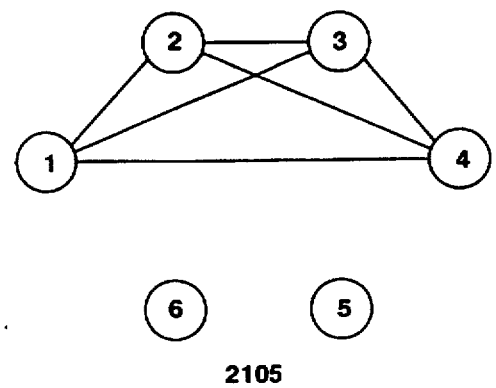
2105

SYSTEM AND METHOD FOR OPTIMAL LOGICAL NETWORK CAPACITY DIMENSIONING WITH BROADBAND TRAFFIC

PRIORITY UNDER 35 U.S.C. § 119(e) & 37 C.F.R. § 1.78(a)(1)

This nonprovisional application claims priority based upon a prior U.S. Provisional Patent Application entitled "Efficient Dimensioning Methods For Broadband ATM Networks With General Type of Traffic", Ser. No. 60/001,169 (Attorney Docket No. 27946-00094), filed Jul. 14, 1995, in the names of Wlodek Holender and Szabolcs Malomsoky, that is also assigned to the same assignee as the present invention.

CROSS REFERENCES TO RELATED APPLICATIONS

This nonprovisional U.S. Patent Application contains subject matter related to copending Nonprovisional U.S. patent application Ser. No. 08/514,235 entitled "System and Method For Optimal Virtual Path Capacity Dimensioning With Broadband Traffic", filed on Aug. 11, 1995 (Attorney Docket No. 27946-00094) and Nonprovisional U.S. patent application Ser. No. 08/514,480 entitled "System and Method For Adaptive Routing On A Virtual Path Broadband Network", filed on Aug. 11, 1995 (Attorney Docket No. 27946-00095). These Nonprovisional U.S. Patent Applications and the disclosures therein are hereby incorporated by reference herein.

BACKGROUND OF THE INVENTION

1. Technical Field of the Invention

This invention relates to a system and method for the efficient dimensioning of a telecommunications network, and more particularly, to a technique for dimensioning logical links and virtual networks defined on a constrained physical network.

2. Description of Related Art

Telephone instruments and other communications devices located in a localized geographic area are conventionally connected with one another by means of switching equipment referred to as local exchanges. Local exchanges, in turn, are interconnected by trunk exchanges. Telephone/data instruments located in geographic areas separated from one another and connected to different local exchanges communicate with one another via a complex grouping of local and trunk exchanges linked together into a telecommunications network. A telecommunication network thus comprises a plurality of interconnected network elements, such as local exchanges, trunk exchanges, mobile radio exchanges, long distance exchanges and combinations thereof. At each network level, traffic from one network element, such as an exchange, to another network element can take various routes that pass through different exchanges.

Efficient network traffic management of the communication facilities within a network requires that a sufficient number of circuits be available to handle the traffic requirements of each destination without exaggerated congestion on last-choice traffic routes. It also requires that the network congestion be as even as possible on all last-choice routes and that unused capacity within the routes which are actually provided be minimized in order to insure efficient utilization of resources. In addition, the telephone company which operates a network has a limited budget and consequently must get as much efficiency as possible out of the existing resources in each network.

In the past, traffic management within a communications network has included procedures for periodically surveying the traffic patterns within the network and changing the configuration of circuits and routes to increase the traffic handling efficiently. In addition, more routes and circuits may be added to a network in anticipation of high call densities to a particular location or a particular region and to local events within that region. Conventional network management systems are also capable of changing the relative distribution of traffic loads between selected routes within the network in order to efficiently maximize the utilization of the network without excessive degradation in the quality of service (QoS). However, conventional traffic network management systems and procedures have generally strived to increase the availability of circuits and routes within a network to handle individual traffic demands rather than to reconfigure a network by redimensioning the routes and circuits within it at a higher level of abstraction so as to maximize the overall efficiency of the network.

In addition to the inherent need to maximize the efficiency of managing physical network resources within a telecommunications system, the growth in information and communications technologies in recent years has created a wealth of new economic opportunities and managerial challenges. Vendors providing telecommunications services are continually faced with new customer demands. Providing ordinary voice communications through a telecommunications network is no longer enough. Today's users want the ability to transmit not just voice signals, but also data, audio, video and multimedia signals in both real time as well as through packet switching networks. Asynchronous Transfer Mode (ATM) technology is acquiring increasing significance due to its enhanced ability to provide broadband telecommunications facilities.

A principal feature of ATM technology is its flexibility in the utilization of network resources. One possible approach to exploit this flexibility is to partition the physical network resources, either completely or partially, into logically defined resources. For example, by partitioning a physical network into a plurality of virtual networks, the operation, maintenance and management of a physical network can be substantially simplified. By this procedure, the task of analyzing and solving the traffic routing problem for each call over an entire physical network can be reduced to the considerably simpler routing problem on each virtual network. Each of the individual virtual networks have less complexity than the entire physical network as a whole, making the solution of the traffic routing problem easier.

Partitioning of physical resources can also be necessitated by the existence of different traffic types, different classes of service or varying traffic demands within leased networks. Instead of providing a separate physical network for each customer application, a service provider can set up a number of virtual networks defined on top of a single common ATM physical infrastructure.

This new flexibility in the configuration of virtual network structures demands efficient dimensioning tools, methods and algorithms. Since the nature of the telecommunications services that will be offered in the future are hard to predict, any dimensioning method that is used to manage the configuration of virtual network resources must be capable of dealing with all types of broadband traffic. If the configuration of a virtual network has to be frequently revised in order to adapt to changes in the pattern of offered traffic, then the computational efficiency of the network redimensioning and configuration control system also needs to be high. An algorithm selected for performing network redimensioning and reconfiguring a network should perform its calculations in a time period that is much shorter than the time duration of each virtual network.

Many existing dimensioning techniques are excluded by the requirement that the dimensioning technique be capable of modeling a general traffic distribution. Most commonly used dimensioning methods are not capable of handling general traffic models because of limitations arising from the use of the Erlang blocking measure. The method and system of the present invention overcomes these disadvantages.

SUMMARY OF THE INVENTION

It is therefore an object of this invention for a user to be able to dimension a network using a general traffic distribution model. It is a further object of this invention to be able to perform the dimensioning calculations using a minimum of computational resources. Another object of the present invention is to implement a dimensioning algorithm that has low computational complexity, and consequently, higher speed. Yet another object of this invention is to be able to perform the redimensioning calculations in as short a period of time as possible. It is a further object of this invention to increase the efficiency of the virtual network dimensioning and the virtual path dimensioning processes.

Given a physical network comprising a plurality of physical links, where each physical link has a prespecified transmission capacity, the system and the method of the present invention illustrates a dimensioning technique that supports a general traffic model. The dimensioning task is treated as a load balancing problem over the various physical links. The optimal solution to the virtual path dimensioning problem corresponds to that choice of allocated capacities over the various virtual paths wherein the blocking on each of the virtual paths is made as uniform as possible over the various links.

In one aspect, the present invention includes a method for efficiently dimensioning a telecommunications network having a plurality of physical links that interconnect a plurality of exchanges or nodes. A plurality of physical links are related to one or more virtual paths. Each of the virtual paths provide an individually switchable connection between a pair of exchanges or nodes in the telecommunications network. Offered traffic is specified for each of the virtual paths and a transmission capacity constraint is set for each physical link of the telecommunications network. The relationship between offered traffic and other computational parameters is modeled on the telecommunications network using an entropy-blocking measure and capacities are allocated to the plurality of virtual paths subject to the transmission capacity constraints for the various physical links such that the blocking probabilities on the various virtual paths are made as uniform as possible within a preselected error bound.

BRIEF DESCRIPTION OF THE DRAWINGS

A more complete understanding of the method and system of the present invention may be obtained by reference to the detailed description of the preferred embodiments that follows, taken in conjunction with the accompanying drawings, wherein:

FIG. 21 is a diagram depicting five distinct sub-networks that are superposed on the six-node physical network of FIG. 16.

DESCRIPTION OF THE PREFERRED EMBODIMENT

Congestion Control Within Conventional Networks

Figure 1:
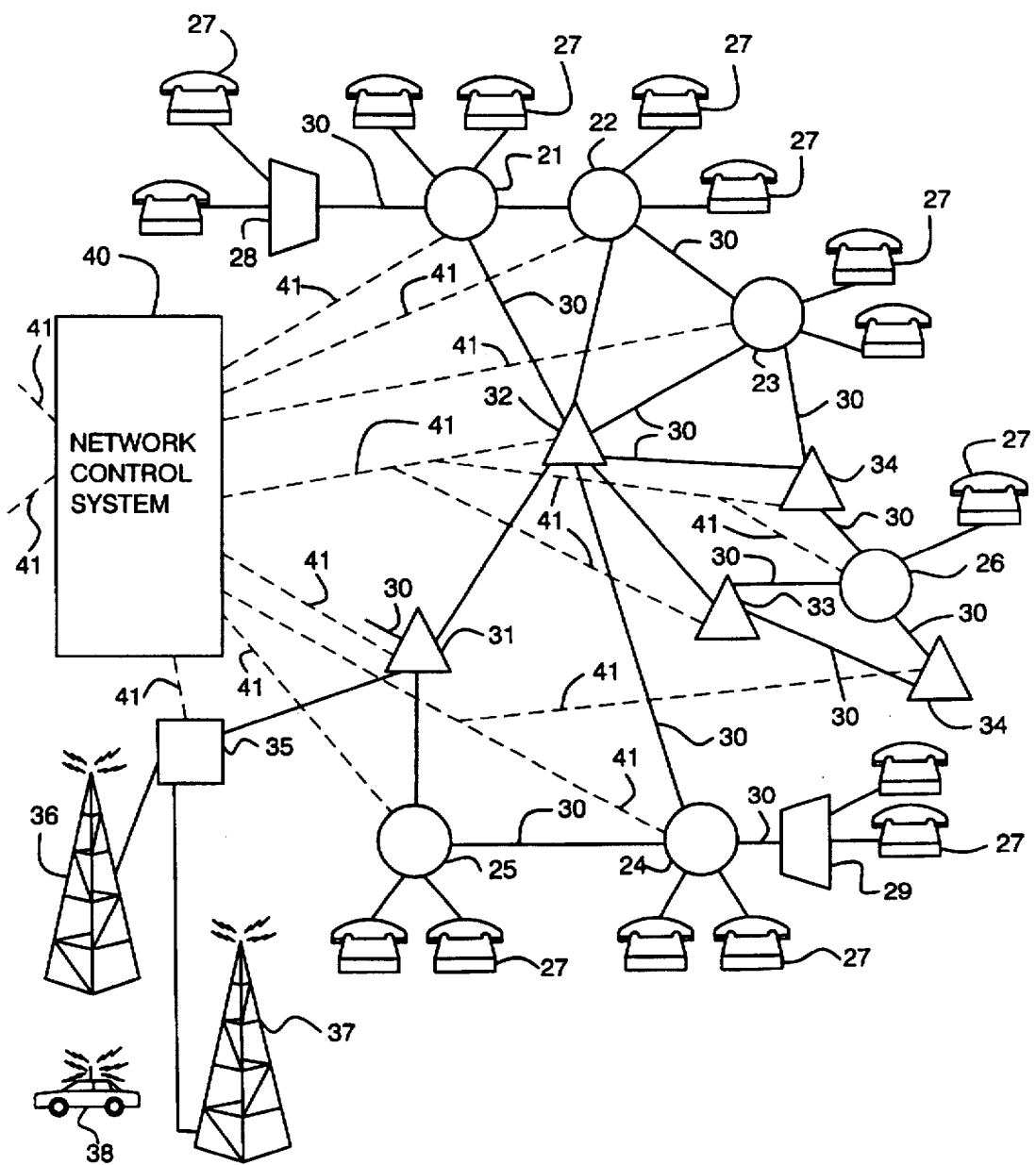
FIG. 1 is a block diagram of an illustrative telecommunications network within which virtual path dimensioning may be effected.

Turning first to FIG. 1, there is shown an illustrative schematic diagram of a conventional public telecommunications network including a plurality of local exchanges 21 to 26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31 to 34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38. In addition, other telecommunications services such as databases and intelligent networks may also be connected to various ones of the exchanges shown. Between each of the exchanges 21 to 35 in the network, there are shown a plurality of communication paths 30, each of which may comprise a plurality of communication circuits, including cables, optical links or radio links for carrying voice and/or data communication between the various exchanges within the network.

The network of FIG. 1 also includes a network control system 40 which is connected to each of the exchanges 21 to 35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the alleviation of congestion conditions within the network.

ATM System Concepts

Numerous changes are currently taking place within public telecommunications transport networks which are being implemented. One of the major goals for operators of public telecommunications networks has been to deploy a single type of technology to handle the transport and switching of all types of telecommunications services within a common infrastructure. One such technology is the Asynchronous Transfer Mode (ATM) technology.

ATM is currently being implemented in an attempt to satisfy these needs by creating a bearer telecommunications network which has substantial "bandwidth granularity" and which is capable of coping with very high bandwidth connections. The term "bandwidth granularity" refers to a characteristic of a network in which the bandwidth required by a call can vary freely throughout the duration of the call.

The use of ATM technology in the public telecommunications network provides the capabilities of common switching and transport for related services, increased bandwidth granularity, support of variable-bit-rate services, and support of multimedia services. Because of these features, ATM has been chosen by the International Telegraph and Telephone Consultative Committee (CCITT) as the core technology for broadband ISDN (B-ISDN) services. This is despite the disadvantages of ATM, including transit delays for low speed isochronous services, added complexity within a network, and the introduction of new performance parameters (such as cell-loss and congestion), with which the system of the present invention deals, as will be further set forth below.

An ATM network may be implemented using either plesiochronous digital hierarchy (PDH) or synchronous digital hierarchy (SDH), or both. Moreover, pure ATM may be used as the bearer for a network whenever the limitations arising from multiple conversions between ATM and STM (synchronous transfer mode) and the resultant performance degradations can be dealt with.

Figure 2:
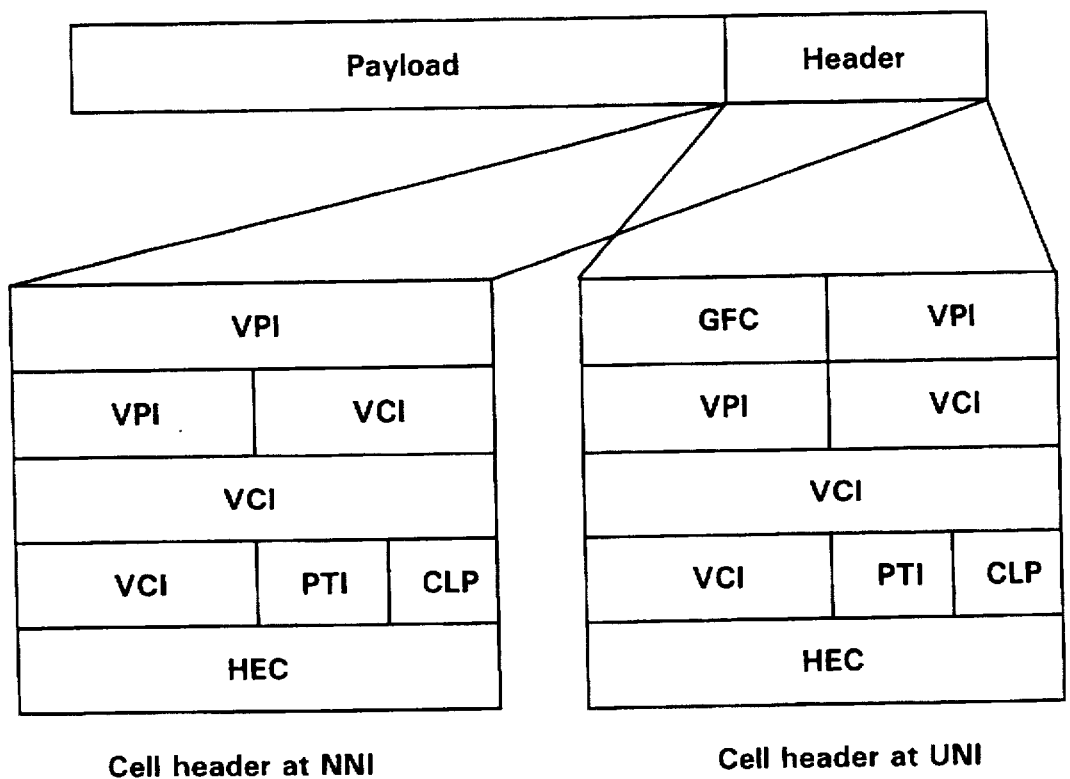
FIG. 2 is a block diagram illustrating exemplary ATM cell structure.

The ATM cell structure shown in FIG. 2 is at the heart of ATM technology. An ATM cell has a fixed length of 53 bytes, or octets, divided into a 5-octet header and a 48-octet information field (also known as the payload). The ATM cell header is structured as a number field and one of its main functions is to assist in routing the ATM cell from the point of origin to the point of destination through one or more switching nodes. The information held in each ATM cell is kept relatively small in order to reduce the size of the internal buffers in the switching nodes and to limit the queuing delays in those buffers. ATM operates in a connection-oriented mode. This is important from a modeling viewpoint since it makes it possible to use the results of well-established circuit-switched mathematical models to optimize the allocation and control of network resources.

The principal function of the ATM cell header is the identification of the virtual connection. Routing information within the ATM cell is contained within two fields: a virtual path identifier (VPI), which determines which virtual path the ATM cell belongs to, and a virtual channel identifier (VCI), which determines which virtual channel in the virtual path the cell belongs to.

A virtual channel is a dynamically allocable end-to-end connection. Optical transmission links are capable of transporting hundreds of megabits per second, whereas virtual channels may fill only a few kilobits per second of a link. Thus, a large number of simultaneous virtual channels can be supported on a single transmission link.

A virtual path, on the other hand, is a semi-permanent connection between endpoints. Each of virtual paths can transport a large number of simultaneously-connected virtual channels. Since a large group of virtual channels are handled and switched together as a single unit, the total processing requirements of a virtual path are less than that of a virtual circuit, and consequently there is faster processing per (virtual) circuit, resulting in a significantly more efficient use of network resources. The network management of virtual paths is relatively simple and efficient.

As illustrated in FIG. 2, the ATM cell header is slightly different at the user-network interface (UNI) compared with the network-node interface (NNI). The UNI contains four bits for generic flow control (GFC) and is used to ensure fair and efficient use of available capacity between a terminal and the network. A payload type indicator (PTI) field is used to indicate whether an ATM cell contains user information or special network information, e.g., for maintenance purposes. A cell loss priority (CLP) field encodes a two-level priority and is used when it becomes necessary to discard cells because of network conditions. The header information is protected by a check sum contained within the header error control (HEC) field.

The use of ATM cells permits the information transfer rate to adapt to the actual service requirements. Depending upon the capacity required, the number of cells per unit of time can be increased up to the transmission bit-rate limit of the physical medium used to carry the data. In addition to data cells there are also cells for signaling and maintenance and idle cells. Signaling cells are used between an end user in the network, or between nodes in the network and their function is to setup a service, e.g., a connection. Maintenance cells provide supervision of the ATM layer while idle cells are used to fill the transmission capacity up to the rate of the transmission medium.

Figure 3:
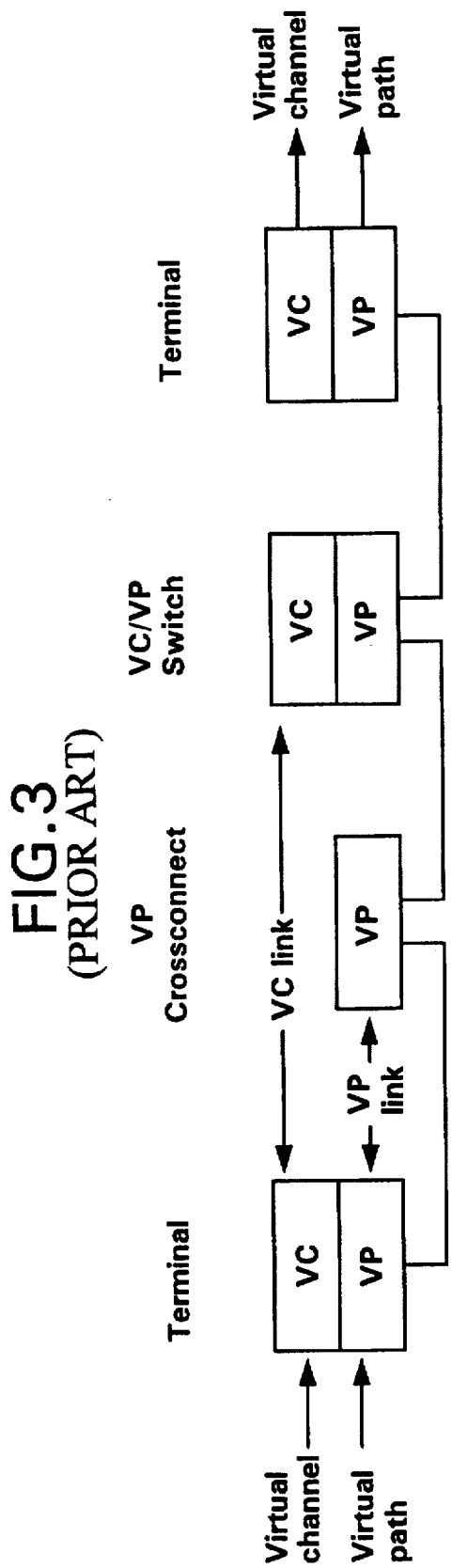
FIG. 3 is a block diagram illustrating a number of interconnected virtual paths and virtual channels within an ATM network.

Referring to FIG. 3, there is shown a block diagram illustrating the switching and cross-connection of virtual channels and virtual paths within an ATM link. From the viewpoint of a switch designer, "VP switching" refers to the switching of an ATM cell using only the upper part of the identifier field, that is, the shorter field (VPI). In contrast, in "VP/VC switching" the entire identified field is used (both VPI and VCI). A VP/VC path consist of a plurality of interconnected VP/VC lengths. Switching and cross-connection can be performed at either the VP or the VC level. The virtual path identifier (VPI) and the virtual channel identifier (VCI) define a two-tier handling and routing structure within the ATM circuitry. From the network architectural standpoint, a virtual path (VP) is a bundle of individual connections, a type of "highway" in the route map of an ATM network. One important task in network management is to allocate the right amount of transmission capacity to each such highway (i.e., a virtual path) in order to optimize network performance. This optimization task is the objective of bandwidth management or virtual path dimensioning techniques and is the subject matter of one aspect of the present invention as further discussed below.

Figure 4:
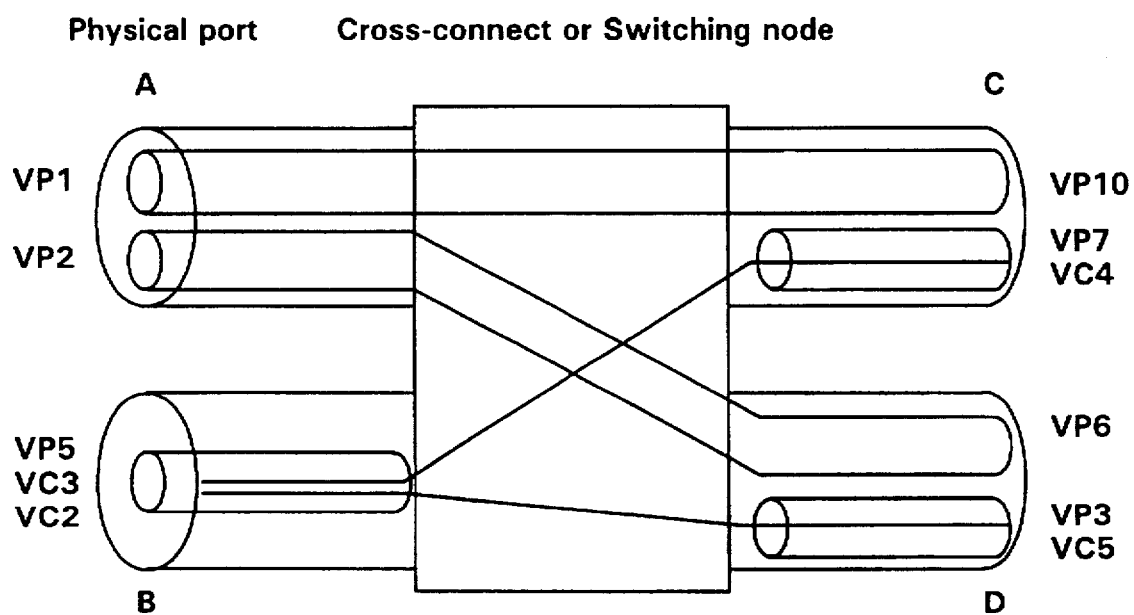
FIG. 4 is a block diagram illustrating the cross-connection and switching of virtual paths and virtual channels within an ATM network.

Referring next to FIG. 4, there are illustrated the concepts of virtual path and virtual channel cross-connection and switching. The virtual path identifier (VPI) and virtual channel identifier (VCI) values are only valid for a specific link. In each cross-connect/switch, new VPI/VCI values are assigned to the cell with the combination of physical port and VPI/VCI values providing the identification for the ATM cell. The routing of an exemplary ATM cell is then performed, with the aid of translation tables such as that illustrated in TABLE 1, as follows:

TABLE 1

| CONNECTED-FROM PORT | VPI | VCI | CONNECTED-TO PORT | VPI | VCI |
|---|---|---|---|---|---|
| A | 1 | — | C | 10 | — |
| A | 2 | — | D | 6 | — |
| B | 5 | 3 | C | 7 | 4 |
| B | 5 | 2 | D | 3 | 5 |

An ATM cell is the basic multiplexing unit within an ATM transport system, with each cell or information unit containing its own connection and routing information. This feature enables direct multiplexing or demultiplexing of service channels wherein each channel may carry different bit-rates. Each ATM cell is identified and routed by information contained in the header within the virtual path identifier (VPI) and virtual channel identifier (VCI) fields. As mentioned above, a virtual path (VP) is a bundle of multiplexed circuits between two termination points, e.g., switching systems, Local Area Network (LAN) gateways, or private network gateways. A VP provides a direct logical link between virtual path terminations, with the VPI value identifying the particular virtual path.

As also mentioned above, the virtual path concept used within ATM technology allows multiple virtual channels (VCs) to be handled as a single unit. Virtual channels with common properties, e.g., the same quality of service (QoS), can be grouped together in bundles that can be transported, processed and managed as one unit. This flexible bundling simplifies the operation and maintenance of an ATM system.

Both virtual paths and virtual channels can be used to provide semi-permanent paths within the ATM network. Routes are established and released from an operation support system by the setting of "path connect tables" in the cross-connect equipment or in the multiplexers along a path. Virtual channels can also be used for on-demand switching with connections being established by signaling either between a user and the network or within the network.

One important characteristic of ATM technology relates to its protocol architecture and is built around the so-called "core-and-edge" principle. The protocol functions specific to the information type being transported, such as retransmissions, flow control, and delay equalization, are performed in terminals at the "edges" of the ATM network. This leaves an efficient, service-independent "core" network, that only includes simple cell-transport and switching functions. Within the ATM nodes in this core, there are no error checks on the information field nor are there any flow controls. The cell information is simply read, the HEC is then used to correct single-bit errors that might affect the address and the cell is then switched towards its destination.

Figure 5:
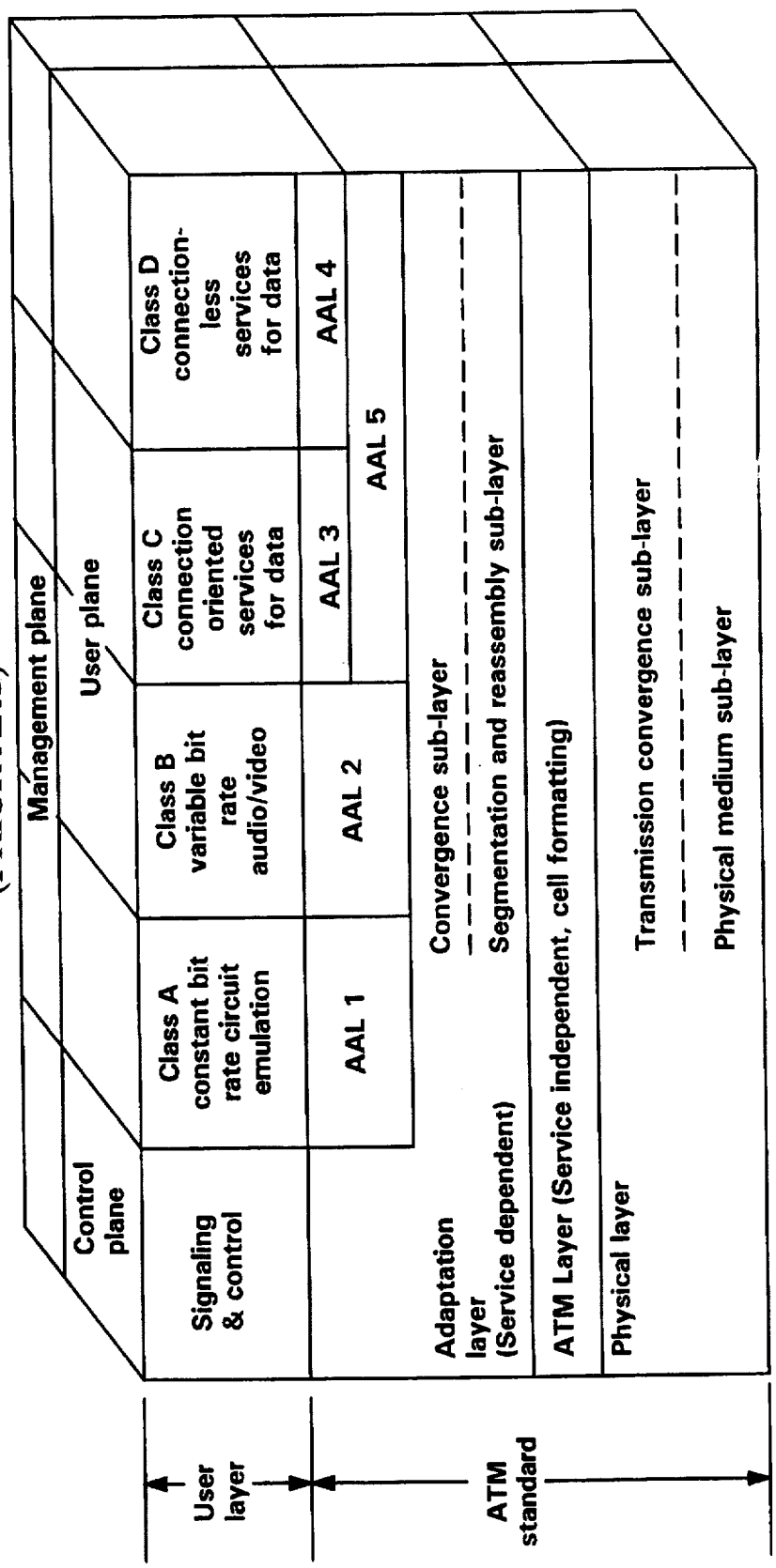
FIG. 5 is a diagram illustrating the CCITT B-ISDN reference model showing the variety of service classes supported and the layers of the standard.

An ATM adaptation layer (AAL) is used at the edge of the network to enhance the services provided. As shown in FIG. 5, the CCITT reference model for B-ISDN services envisages that the AAL includes service dependent functions. As depicted in FIG. 5, there are three layers in the ATM standard. The first layer is the physical layer defining the physical interfaces and framing protocols. The second ATM layer is independent of the physical medium chosen and defines cell structure, provides multiplexing and demultiplexing and VPI/VCI translation to control the flow of cells within the logical network. The third layer is the AAL which provides the important adaptation between the service and the ATM layer thereby allowing service-independent ATM transport. The AAL performs mapping between the original service format and the information field of an ATM cell. Exemplary functions provided by the AAL include variable-length packet delineation, sequence numbering, clock recovery and performance monitoring.

Deployment of ATM in Telecommunications Networks

One use of ATM technology can be used within customer premises to support high speed data communications in and between customer local area networks. In addition, ATM can be used as an infrastructural resource that is common to all services within a customer premises network, including voice and video communications, data transfers and multimedia applications.

An exemplary service for which ATM nodes are introduced into a public telecommunications network is to provide virtual leased line (VLL) service. VLL service is based upon a virtual path concept and allows line capacity to be directly tailored to customer needs and easily changed without modifying the interface structure. A large number of logical connections can be offered to a user through user-network interfaces (UNIs). In addition, a custom tailored quality of service can also be offered to a customer, matching the needs of the user. Thus, multiple classes of service, quality of service classes and performance parameters can be selected. For example, voice services require low transmission delays but can tolerate high bit-errors, while data communications, on the other hand, are more tolerant of network delays but are sensitive to bit-errors. Thus, the quality of service level of a particular application can be contractually agreed to between a service manually, and a customer and audited manually or automatically to ensure compliance.

Figure 6:
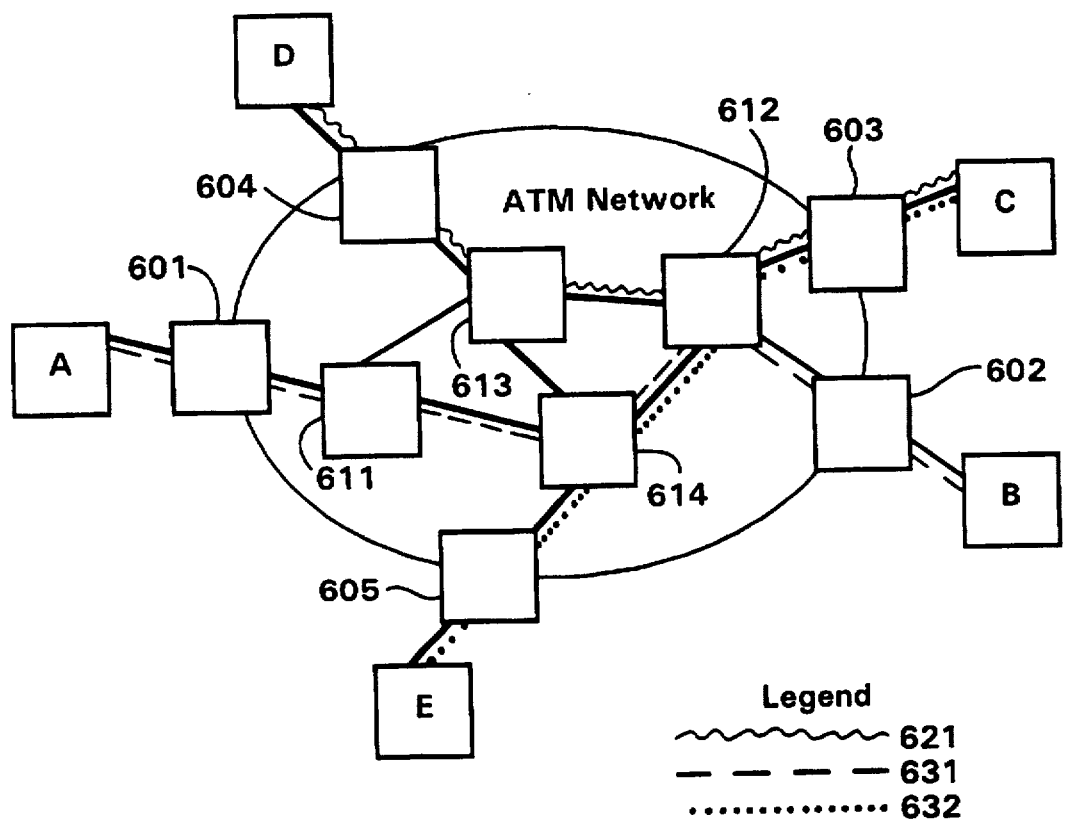
FIG. 6 is a diagram showing an illustrative ATM network providing virtual leased line (VLL) service.

As shown in FIG. 6, there is an exemplary virtual channel based VLL service implemented within a ATM network. Network terminals A to E are each coupled through flow enforcement nodes 601 to 605, respectively, to ATM cross-connect nodes 611 to 614. The ATM network consist of a plurality of ATM cross-connects 611 to 614 which can provide routing both at the virtual path as well as at the virtual channel level. The flow enforcement functions 601 to 605 are located at the edge of the ATM network to protect the network against potential overloads. This function ensures that no connection violates the conditions agreed-to when the connections are setup. Additional services can be implemented by adding services to one or more of the cross-connect nodes 611 to 614. Within the network of FIG. 6, an exemplary virtual path is illustrated by the wavy line 621 between terminal C and D. A first virtual connection between terminals A and B is illustrated by the dashed line 631 while a second virtual connection is illustrated by the do-ted line between terminals C and E, as illustrated by the dotted line 632.

In addition to the virtual leased line network shown in FIG. 6, other services, such as SMDS/CBDS and frame relay, can easily be added depending upon demand by connecting servers to the ATM nodes within the network. In residential areas, ATM technology can be used to provide new and enhanced entertainment services such as on-demand video to the end user. The flexibility of an ATM network makes it possible to support a multitude of services, such as long distance education, home shopping, and games.

Figure 7:
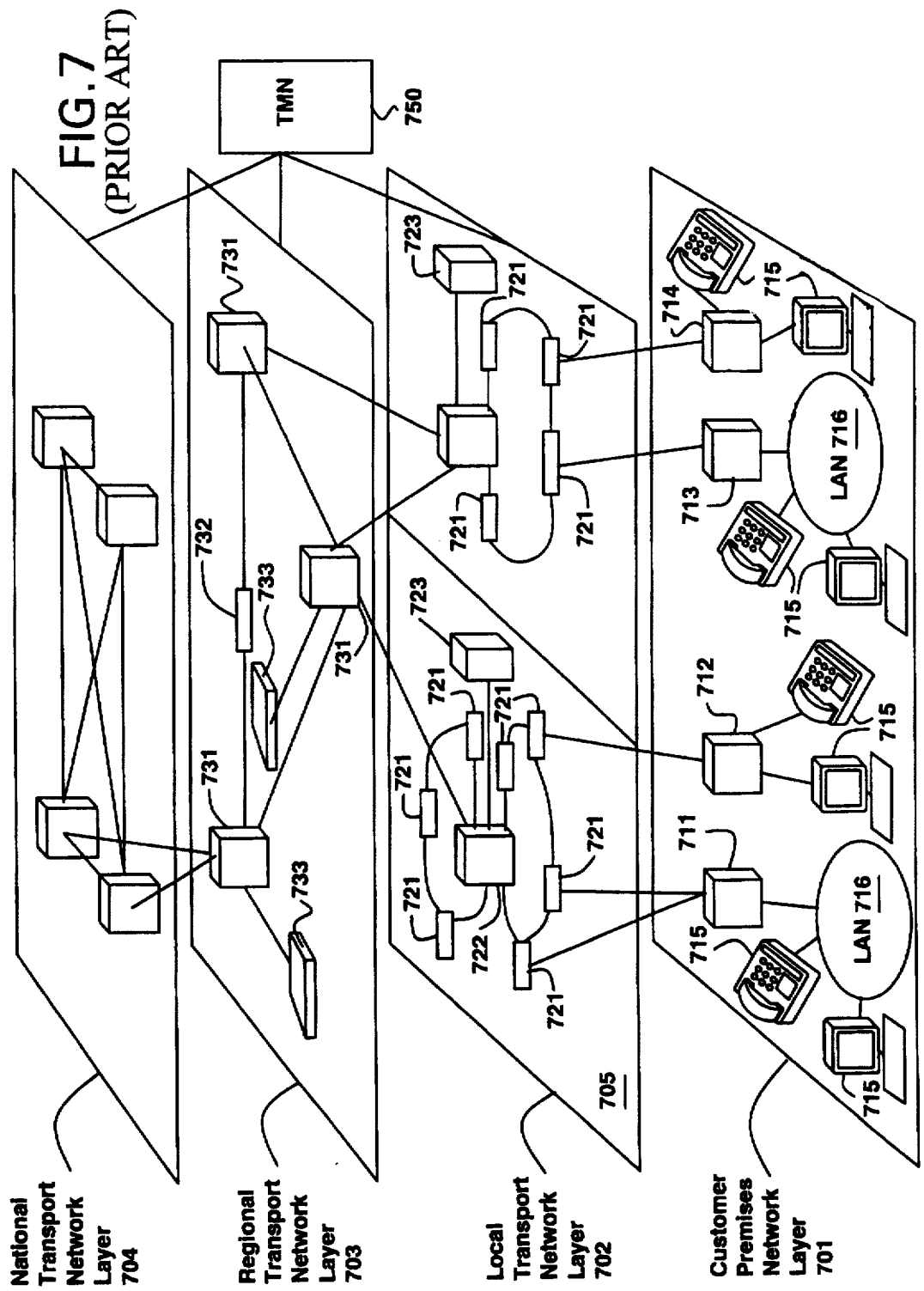
FIG. 7 is a diagram illustrating a multi-layered SDH-based transport network which includes ATM cross-connects.

FIG. 7 illustrates an ATM network which has been overlaid upon a SDH-based layered transport network. The layers include a customer premises network layer 701, a local transport network layer 702, a regional transport network layer 703 and a national transport network layer 704. A plurality of ATM business network nodes 711 to 714, control the flow of data from the customer premises terminals 715 and LANs 716 into respective ones of a plurality of add-drop multiplexers (ADM) 721 serving SDH cross-connect nodes 722 within the local transport network 705. The local cross-connect nodes 722 are in turn coupled through regional cross-connect nodes 731 in the regional transport network, two of which are coupled by add-drop multiplexers 732. Within the local transport network layer 702, a pair of ATM access nodes 723, and SDH rings, comprising the add-drop multiplexers 721, serve the cross-connects 722 and are used for subscriber access with a capacity of up to a full STM-1 (155 megabits per second), the standardized access rate for B-ISDN services.

Existing traffic such as Plain Old Telephone Service (POTS) can also be carried on this ring network, with remote multiplexers and other access nodes providing the final local-loop connection. The ATM access nodes 723 are shared for access to different services from one location and can include both voice and data using different VP/VCs. In the ATM access nodes 723, ATM traffic is concentrated to make more efficient use of the transport capacity.

The size of a ATM access node can vary, depending upon the capacity required, from a small multiplexer to a large cross- connect. In the regional transport layer 703, ATM cross-connects 733 are used to route traffic between local areas. In the national transport network layer 704, illustrated in FIG. 7, ATM is not visible. In an ATM overlay network, in place as illustrated in FIG. 7, services such as frame relay and SMDS/CBDS are easily added. Functionality for B-ISDN can also be added to both access and regional nodes by adding appropriate software and hardware. As also illustrated in FIG. 7, a network management system 750, such as one operating in accordance with the TMN standard of the CCITT can be implemented to provide the necessary network management functionality to both the SDH and ATM elements of the network.

The management of the ATM network by subsystem 750 may be implemented in accordance with the telecommunications management and operations support (TMOS) family of network management systems provided by Telefonaktiebolaget LM Ericsson, the assignee of the present application. Such network management may include various functionalities such as routing algorithms and congestion control implemented in accordance with the teachings of the present invention as set forth in detail below.

Virtual Path Capacity Dimensioning

A useful model in dimensioning a telecommunications network is to treat the dimensioning problem as involving a two-layered structure consisting of a first physical network layer, with discrete topology and specified link capacities and a second virtual path layer with virtual paths and their particular routings. A traffic demand is offered to the virtual paths in this model. In dealing only with the task of dimensioning network capacity, the virtual paths are, ipso facto, already routed. Each virtual path may travel through numerous physical links but will emulate a highway comprising only a single path. Each virtual path will have one characteristic blocking value and one characteristic allocated capacity value with only as many variables in the model as there are virtual paths.

The term "offered traffic" is used to refer to the time varying demand for transmission capacity along each virtual path. The term "traffic demand" is used to indicate the time-averaged value of the offered traffic for each link. When the characteristics of the traffic on an ATM network can be modeled by a single-parameter Poissonian distribution, the traffic is termed as homogenous single-class traffic. When the offered traffic is non-homogeneous, it is usually modeled using a multi-class Poissonian distribution.

The offered traffic can also be modeled by a normal distribution. This is referred to as normal traffic. Finally, network dimensioning can also be based upon actual traffic as determined by measurements.

The transmission requests of a multitude of users can be combined into an aggregated traffic stream. For example, several users could be sending messages from Dallas to Stockholm contemporaneously. Instead of managing these multiple transmissions individually, it is more efficient to combine and transmit them as a group over a broadband trunk line. As discussed above, a virtual channel is a dynamically allocable end-to-end connection. A virtual path is a logical construct that allows multiple virtual channels to be handled and switched together as a single unit. This unified switching reduces the processing requirements overall and also speeds up the transmissions. Since the management of a virtual path is both simpler and more efficient than the management of virtual channels or individual physical circuits, a significantly improved utilization of network resources can be obtained by this technique.

The Virtual Path Dimensioning Model

The basic model that is considered is that of a connection-oriented network that is operating under a fixed routing. If we define the physical network as comprising a set J of arbitrarily connected links, then each virtual path (VP) or route r is an ordered list whose elements are a subset of J. The relationship between the virtual paths and the physical links can be defined in terms of a routing matrix, $\chi$, whose elements are:

$$\chi_{j,r} = \begin{cases} 1 & \text{if } j \in r \\ 0 & \text{otherwise} \end{cases} \quad \text{(EQN. 1)}$$

Figure 8:
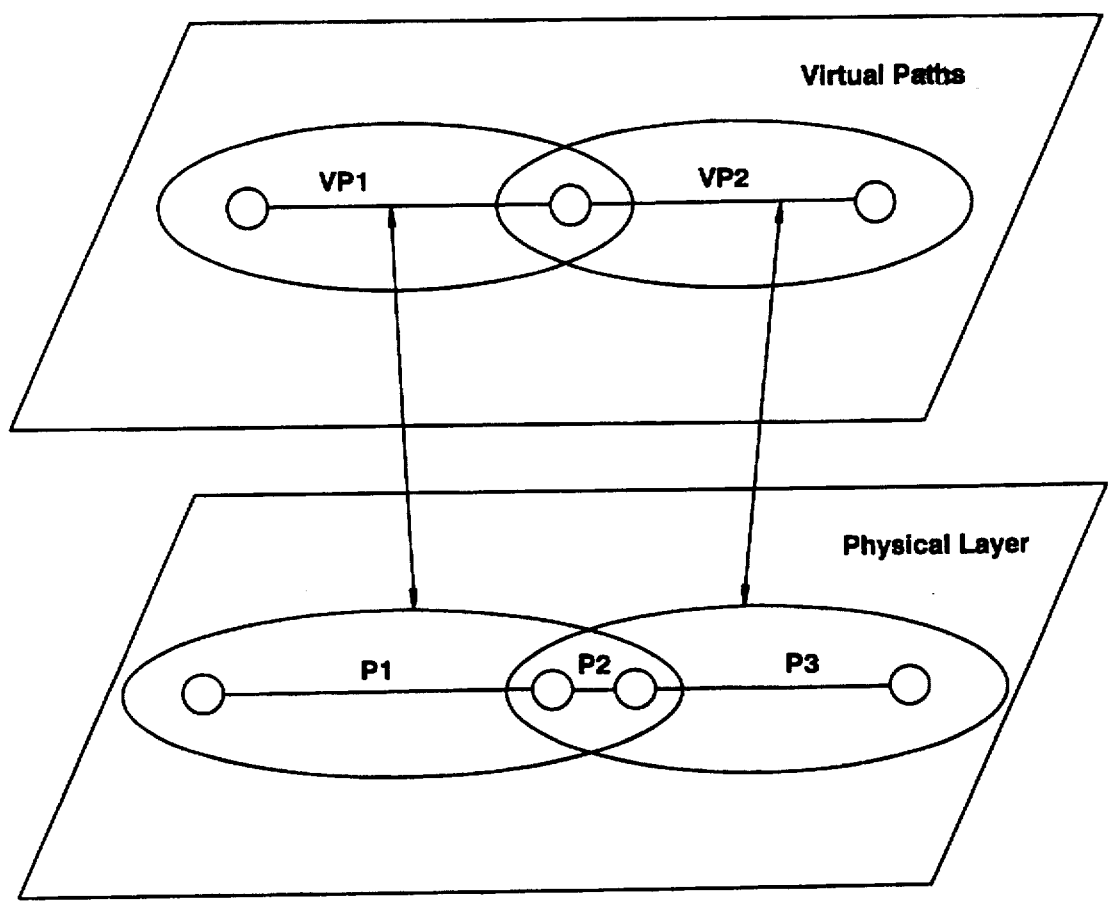
FIG. 8 is a diagram illustrating the topological relationship between virtual paths and physical links.

FIG. 8 illustrates the topological relationship between virtual paths and physical links. In FIG. 8, virtual path, $VP_1$, consists of physical links $P_1$ and $P_2$, and virtual path, $VP_2$, consists of physical links $P_2$ and $P_3$.

The quantitative relationship between the capacities allocated to various VPs and the corresponding capacities allocated on physical links is given in matrix form as:

$$\chi C_{VP} = C_{phys} \quad \text{(EQN. 2)}$$

where $\chi$ is a routing matrix of the type defined in Equation (EQN. 1) above. $C_{VP}$ is the virtual path capacity vector and $C_{phys}$ is the physical link capacity vector.

The physical link capacity vector, $C_{phys}$, representing the capacities that have been allocated to the various VPs, cannot exceed the available physical capacities on any of the physical links. This limitation can be expressed by the simple constraint relation:

$$\chi C_{VP} = C_{phys} \leq \bar{C}_{phys} \quad \text{(EQN. 3)}$$

where $\bar{C}_{phys}$ is a vector describing the available physical capacities on each of the K physical links. Since Equation (EQN. 3) is a vector inequality, it is important to note that corresponding components of both vectors have to satisfy this inequality. For the simple example shown in FIG. 8, the routing matrix $\chi$ is:

$$\begin{bmatrix} 1 & 0 \\ 1 & 1 \\ 0 & 1 \end{bmatrix} \quad \text{(EQN. 4)}$$

where the relation between virtual paths capacities and corresponding physical link capacities allocated to VPs is:

$$\begin{bmatrix} 1 & 0 \\ 1 & 1 \\ 0 & 1 \end{bmatrix} \cdot \begin{bmatrix} C_1 \\ C_2 \end{bmatrix}_{VP} = \begin{bmatrix} C_1 \\ C_1 + C_2 \\ C_2 \end{bmatrix}_{phys} \quad \text{(EQN. 5)}$$

where $$\begin{vmatrix} C_1 \\ C_2 \end{vmatrix}_{VP}$$

is the virtual path capacity vector and $$\begin{vmatrix} C_1 \\ C_1 + C_2 \\ C_2 \end{vmatrix}_{phys}$$

is the allocated vector for the physical links.

The call request process to a given route r can be any stationary process for which we know the fictitious occupancy distribution if the process were to be provided with a resource having infinite capacity that accepted all calls and avoided all blockage. $X_r$ denotes the occupancy level of this fictitious infinite capacity resource, and is commonly referred to in the art as "offered traffic".

The virtual path dimensioning problem is defined in the system and method of the present invention as having two objectives. First, the transmission capacity allocated to each virtual path needs to be optimized so as to minimize a transmission cost function. Second, for every physical link, the capacities allocated to the various virtual paths traversing this link must not exceed the physical transmission capacity constraint of that physical link.

The physical capacities that can be allocated to the various virtual paths can be approximated by a continuous function that assumes any real value in the range [0, $\bar{C}_{phys}$]. Consequently the resource optimization task does not require discrete optimization and all of its attendant complexities. In the dimensioning problem addressed in this application, load sharing between different VPs has not been considered. The offered traffic is assumed to be defined for each virtual path. Further, because the network has fixed routing, the routing of the offered traffic is fixed by the choice of the virtual paths.

The "Push Down" Dimensioning Technique

The virtual path dimensioning task is viewed in the present invention as a load balancing problem in which the "load" is the value of an appropriate chosen blocking measure and where the optimal solution corresponds to that choice of allocated VP capacities wherein the blocking on each of the virtual paths is distributed in as uniform a manner as possible. One way to make the blocking distribution uniform is to measure the divergence in the values of the blocking on the various virtual paths and then to minimize this divergence. This approach can be implemented using any standard minimization algorithm, for example, the well-known simulated annealing technique.

A related approach would be to first identify the virtual path having the highest blocking value and then to minimize the blocking for this virtual path by reallocating capacity from other VPs until the virtual path is no longer the VP with the highest blocking. This formulation corresponds to a min-max optimization problem and can be analytically formulated as described below.

If we denote the blocking on the $i^{th}$ virtual path as $B(VP_i)$ then the VP that has the largest blocking is $\max(B(VP_i))$ where the maximum is taken over all the VPs. The maximum of a blocking measure over the set of virtual paths defines the objective function (also known as the cost function) for the VP dimensioning problem. The goal of the optimization procedure therefore, is to find the minimum of the objective function, which corresponds to:

$$\min \max (B(VP_i)) \quad \text{(EQN. 6)}$$

where the minimum is defined over all feasible configurations.

Since this technique involves pushing down the highest blocking value among all the VPs considered, an algorithm using this technique to solve an optimization problem is called an "Push Down" algorithm. This algorithm follows from the fact that the uniform blocking distribution corresponds to the best solution of the unconstrained VP dimensioning problem. Accordingly, the best solution is to allocate capacities to each VP such that the blocking on each of the VPs is made equal within an error bound. However, such a solution is not always realizable because of the capacity constraints of the various physical links. The limited capacity of a physical link needs to be shared amongst all VPs traversing that physical link.

Figure 9:
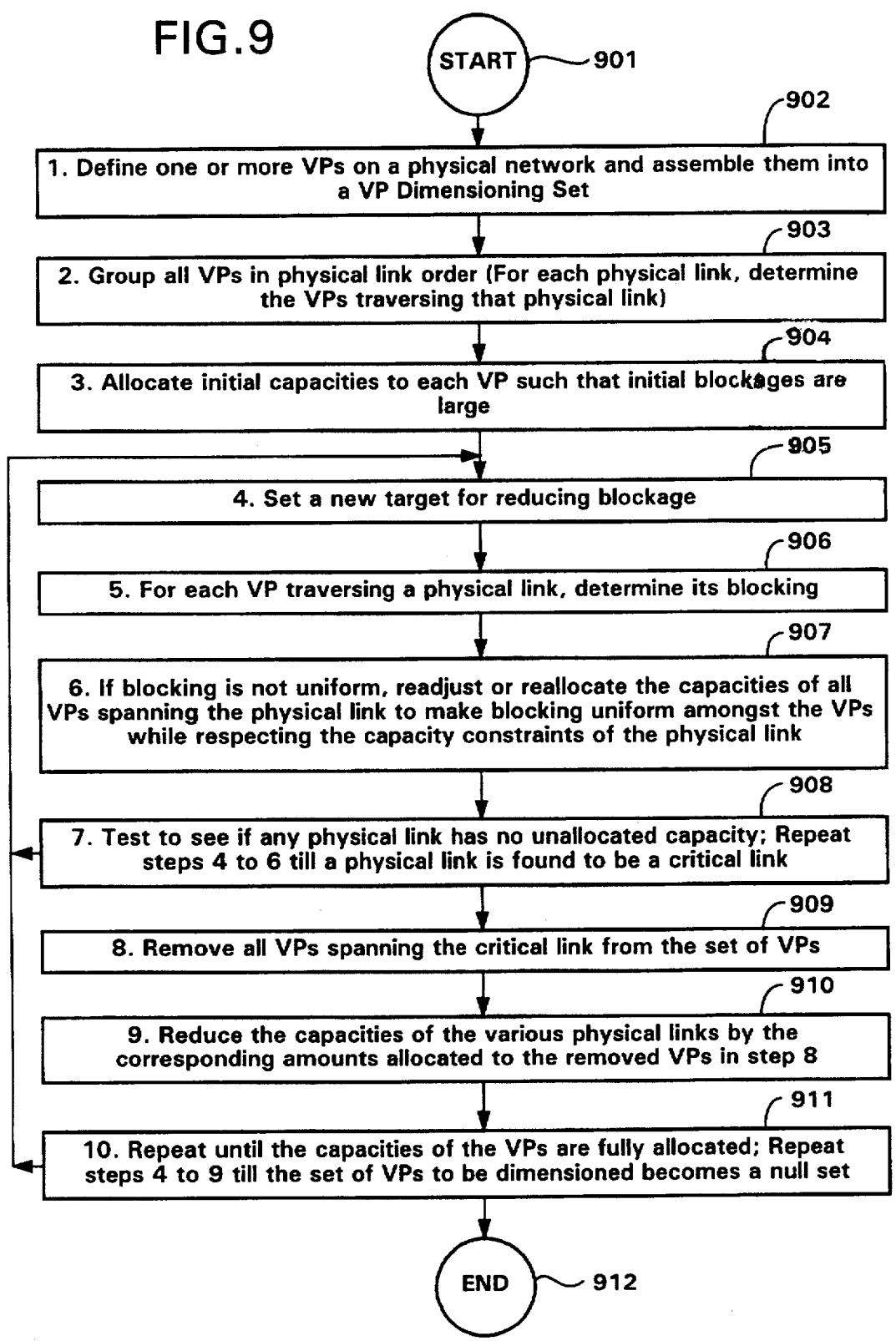
FIG. 9 is a flow chart depicting the various steps of an illustrative Push Down algorithm for dimensioning virtual paths defined on a physical network.

FIG. 9 shows the various steps in one illustrative embodiment of a Push Down Algorithm for dimensioning virtual paths defined on a physical network. The dimensioning process starts at 902 with the definition of the connection topology of the various VPs. The various VPs are also assembled into a VP Dimensioning Set. The VPs are then grouped at 903 in order of the physical links that they each traverse. Initial allocations of transmission capacity are then made to each VP at 904. At 905, a target figure for reduction in blocking is chosen. To set a target, one needs to first select a blocking measure. In one preferred embodiment of the present invention, the Entropy Rate Function, as detailed in the sections following, is used as a blocking measure. The target value is used to set termination conditions for the dimensioning algorithm.

The blocking on each of the VPs is determined at 906 over each of the physical links. If the various VPs traversing a single physical link do not face the same or similar levels of blocking, then the capacities currently allocated to each of the VPs are revised at 907 so as to equalize the blocking values for the VPs within an error bound. Capacity can be added to VPs by the allocation of unallocated physical capacity or by reallocation of already allocated capacity from a less productive VP to a more productive VP. This capacity readjustment is performed without violating the capacity constraints of any of the physical links.

This process results in the identification at 908 of one or more physical links as being the bottle-necks in this optimization procedure. A physical link on which the VP blockage is the highest and whose blockage is not reducible by capacity reallocation is referred to as a critical link. Each critical link determines the lowest blocking that can be achieved on VPs traversing that physical link. One of the principal tasks of the Push Down algorithm is to identify, at each stage of the optimization procedure, the set of critical links for a given set of virtual paths.

Once a critical link is identified at 908, physical capacities can be reallocated between the various virtual paths traversing this critical link in such a way as to equalize the blocking values for each of the virtual paths. It should be noted that when a physical link is found to be a critical link, ipso facto, it has no unallocated capacity. Consequently, only reallocation of capacity between VPs passing though a critical link is possible after the algorithm reaches this stage of the dimensioning procedure.

Next, at 909, VPs with allocated capacities are removed from the set of all the VPs that still need to be dimensioned. Correspondingly, at 910 the available physical link capacities are reduced by the allocated capacities of the VPs that were removed in the previous step.

The dimensioning problem thus reduces to the optimization problem of minimizing the highest blocking probability for the remaining set of VPs. This permits the use of a recursive re-entrant algorithm to implement this procedure.

The blocking values from the previous step are now used as the initial values in the remaining dimensioning problem. This optimization procedure is recursively repeated at 911 until all the capacities of each of the physical links have been allocated. In summary, this greedy-type algorithm starts with dimensioning the complete set of all VPs and terminates at 912 when the set of virtual paths remaining to be dimensioned becomes a null set.

It should be emphasized that the execution of every dimensioning algorithm of the type detailed herein need not identically follow the order of steps as depicted in FIG. 9. The execution order of some of the steps of the dimensioning algorithm may be different from that shown in FIG. 9 based on implementation details and convergence considerations.

The problem of analytically identifying the critical link in a given set of VPs, has proven to be a difficult task. There are no known techniques for determining the critical link directly from the offered traffic and the physical link capacity constraints. Hence the push down algorithm employs an iterative approach to identify critical links. The algorithm is initialized for all VPs by using a uniform large blocking value for all the VPs. The initial blocking value that is selected has to be large enough so that the sum of the initially allocated values of the VP capacities do not exceed the available physical capacities of the various physical links.

By the slow and uniform reduction in the degree of blocking on the set of all the virtual paths remaining in the optimization procedure, the critical link is identified at each level as being that link which first violates the physical capacity constraints of a traversed physical link.

Dimensioning Using An Entropy Blocking Measure

The speed and efficiency of the above procedure for identifying the critical link at each stage of the dimensioning process is critically dependent upon the complexity of the blocking measure used in the modeling. Traditionally, the Erlang blocking measure (also known as the time congestion blocking formula) has been used to determine the optimal allocation of VP capacities in a network.

The present technique incorporating the use of the Entropy Rate Function as a blocking measure yields superior results to those obtainable by use of the Erlang blocking measure. The use of the Entropy Rate Function permits the modeling of arbitrary traffic distributions, and in most cases this computation can be done much faster compared to computations based upon other blocking measures. It has also been found that the iterative search for the critical link can be substantially improved, a result principally following from the fact that the Entropy Rate Function is a convex function. Prior to a description of a dimensioning algorithm using the Entropy Rate Function, it would be useful to explore the characteristics of the Entropy Rate Function.

The Entropy Rate Function As A Blocking Measure

As noted earlier, the choice of the blocking measure is critical to the Push Down algorithm. A general expression for the blocking measure based on the Entropy Rate Function will be derived next and applied to an exemplary situation where the offered traffic is alternately modeled by single-class and by multi-class Poissonian distributions.

The Entropy Rate Function is known in the art, and has been used to model congestion at the physical link level, see, e.g., J. Y. Hui, *A Congestion Measure for Call Admission and Bandwidth Assignment for Multi-Layer Traffic*, International Journal of Digital & Analog Cabled Systems (1990), but has not hitherto been used as a blocking measure in solving either the dimensioning or the planning problem at either the virtual path level or at the network level. Additionally, the Entropy Rate Function has been used to define the concept of "effective capacity" of a physical link. It is important to note that the dimensioning technique using the Entropy Rate Function detailed herein is not limited to offered traffic that follows a Poisson distribution and that the system and method works equally well with any type of offered traffic distribution, including that determined by measurements.

Saturation blocking probability can be defined as the probability that the traffic demand exceeds a specified value of transmission capacity. The saturation probability is also called the "tail probability", because it denotes the probability mass of the tail of the offered traffic distribution. A well known approximation to this tail probability, namely Chernoff's Bound, is derived below.

Let X be an arbitrary distributed random variable, and C be a given value. Then for all positive values of s, the following bound can be shown to exist:

$$P(X > C) = P(e^{sX} \geq e^{sC}) \leq \frac{E(e^{sX})}{e^{sC}} = e^{-(sC - \ln(E(e^{sX})))} \quad \text{(EQN. 7)}$$

where P(X>C) is the probability that the random variable X takes values greater than C.

The derivation of this bound is based on the Markov inequality. The term, $\ln(E(e^{sx}))$, denotes the log moment generating function, and is also called the cumulant function, $\mu(s)$. The tightest bound (also known as Chernoff's Bound) is obtained by maximizing the exponent $sC-\mu(s)$ with respect to s. This maximum is reached at $s=s^*$ where $s^*$ is the unique positive solution for the equation, $C=\mu'(s)$.

It is easy to show that $\mu'(s)$ increases with s, thereby guaranteeing the uniqueness of its root. $\mu'(s)$ increases with s because $\mu''(s)>0$. This in turn is due to the fact that the second derivative is equal to the variance of the (shifted) distribution. This maximizing exponent is denoted by $I_x(C)$ and is called the Entropy Rate Function. The Entropy Rate Function is the convex conjugate transform of the cumulant function and can be stated by the following expression:

$$-\ln P(X \geq C) \geq \sup_s (sC - \ln E(e^{sX})) = I_X(C) \quad \text{(EQN. 8)}$$

Since $\ln P(X \leq C) = \ln P(-X \geq -C)$, and $\ln P(-X \geq -C) = \ln P(e^{-sX} \geq e^{-sC})$, a similar expression for the left tail of the distribution can be derived by the following inequality:

$$-\ln P(X \leq C) \geq \sup_s (-sC - \ln E(e^{-sX})) = L_{-X}(-C) \quad \text{(EQN. 9)}$$

The relation between the right and the left tails of the Entropy Rate Function distribution can be expressed using the parameter, s as:

$$L_{-X}(-C(s)) = I_X(C(-s)) \quad \text{(EQN. 10)}$$

Thus, by changing the sign of the parameter, s, one can switch from the right tail to the left tail of the Entropy Rate Function distribution and vice versa.

The Entropy Rate Function For Homogenous Poissonian Traffic

The use of the Entropy Rate Function to dimension virtual paths when the offered traffic is homogenous is considered first. Homogenous Poisson traffic can be characterized by a bandwidth demand parameter, p, the mean call arrival rate, r, and the mean duration of each call, h, (also referred to as the mean holding time). The traffic demand, ρ, is therefore the product of the mean call arrival rate and the mean holding time, i.e., r*h. The cumulant function for homogenous traffic is described by the relationship:

$$\mu(s) = \rho(e^{sp} - 1) \quad \text{(EQN. 11)}$$

Consequently, the allocated capacity, C, and the Entropy Rate Function, I, for homogenous traffic are given by:

$$C = \mu'(s) = \rho p e^{sp} \quad \text{(EQN. 12)}$$

and $$I(C) = s^*(C) \cdot C - \mu(s^*(C)) \quad \text{(EQN. 13)}$$

i.e.

$$I(C(s)) = s\rho p e^{sp} - \rho(e^{sp} - 1) \quad \text{(EQN. 14)}$$

By substituting the relation $s = 1/p(\ln C - \ln(\rho p))$ as the solution to Equation (EQN. 12), the Entropy Rate Function for the homogeneous traffic of the type described by Equation (EQN. 14) can also be expressed solely as a function of the allocated capacity, C, as:

$$I(C) = \frac{C}{p}(\ln C - \ln(\rho p)) - \rho\left(\frac{C}{\rho p} - 1\right) \quad \text{(EQN. 15)}$$

Figure 10:
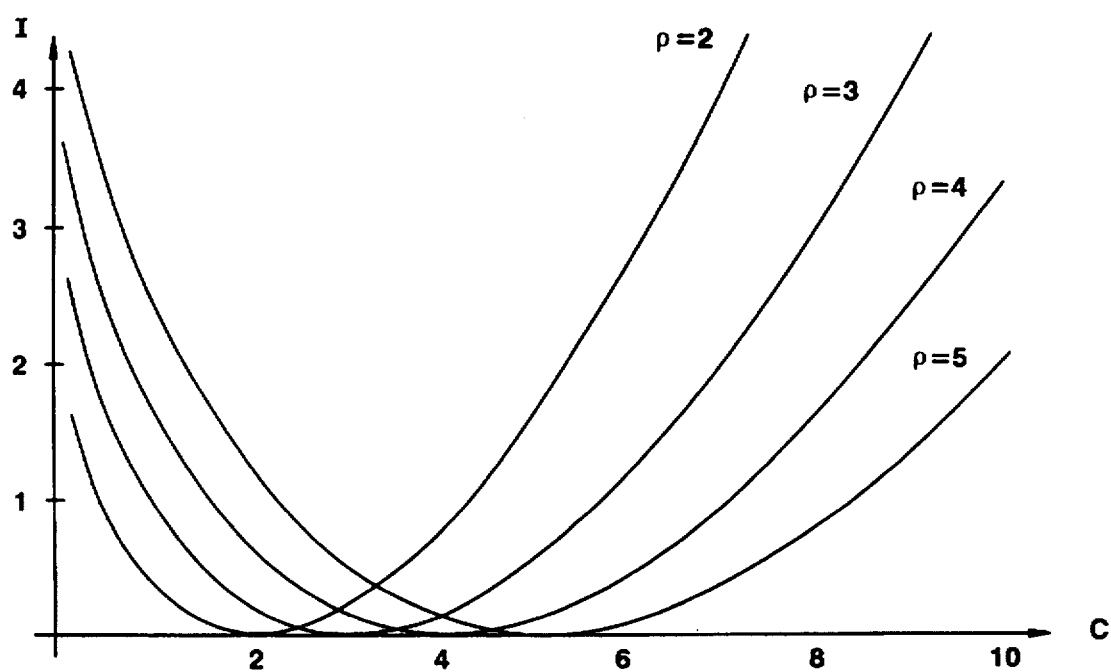
FIG. 10 is a graph illustrating the characteristics of the Entropy Rate Function related to the present invention.
Figure 11:
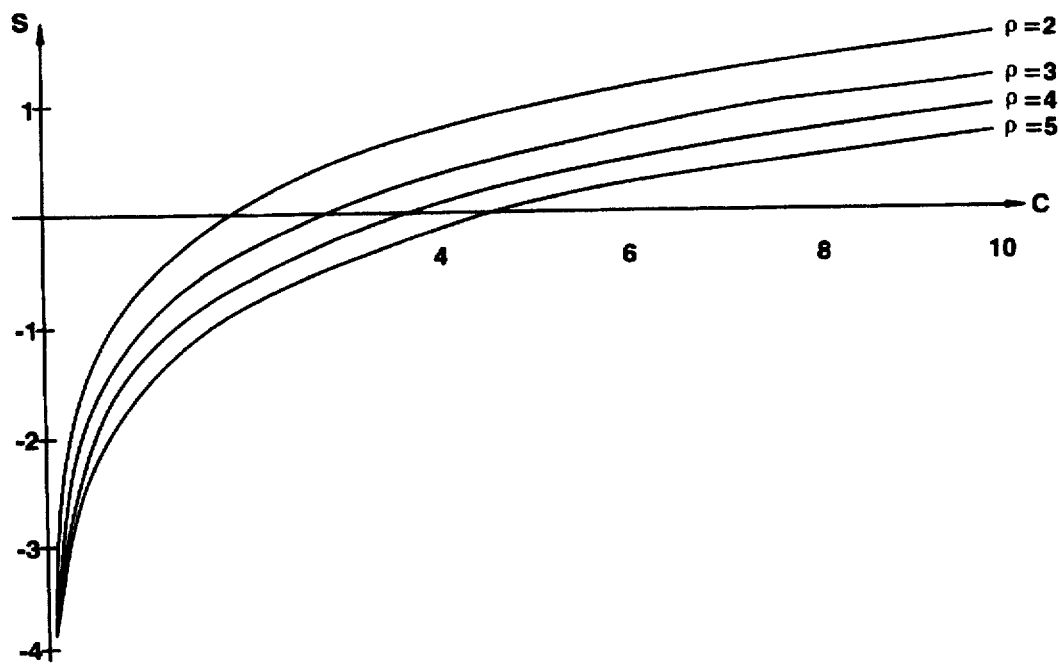
FIG. 11 is a graph illustrating the characteristics of the shift parameter that is related to the Entropy Rate Function illustrated in FIG. 10.

FIG. 10 graphs the characteristics of the Entropy Rate Function for different values of offered traffic in the unit bandwidth demand, p. FIG. 11 shows the shift parameter, s, plotted as a function of the allocated capacity, C.

As shown in FIGS. 10 and 11, the Entropy Rate Function has three significant properties. First, it is a convex function that reaches its minimum value of zero at the mean of the distribution, i.e., when C=ρ. Second, the shift parameter, s, goes from negative to positive for increasing values of C at the mean of the distribution, i.e., at C=ρ. As can be seen from FIG. 11, the shift parameter, s, is negative when C<ρ and is positive when C>ρ. Third, the shift parameter, s, is monotonic and increases as a function of the capacity allocated to a virtual path.

The transform parameter, s, can thus be interpreted as a probability distribution shift parameter. When the shift parameter takes negative values, the probability distribution is shifted to the left compared to the probability distribution corresponding to the zero value of the shift parameter. When the shift parameter takes positive values, then the probability value is shifted to the right.

The Entropy Rate Function For Multi-Class Poissonian Traffic

The traffic model can be extended to offered traffic characterized by a multi-class Poisson distribution and the Entropy Rate Function corresponding to such an offered traffic model is derived next.

Replacing the entropy measure for the single-class distribution with the entropy measure for the multi-class distribution induces the difficulty that the Entropy Rate Function can no longer be explicitly expressed in terms of the allocated capacity, C. To avoid this problem, the Entropy Rate Function is expressed in terms of the shift parameter s which is also utilized as a control parameter. By increasing the absolute value of this parameter, allocated capacities can be varied implicitly, thus permitting the entropy measure to be positively incremented.

Let us denote the random traffic of class i (where i takes values from 1 to k) by $X_i$. The peak bandwidth demand $p_i$, the mean call arrival rate $r_i$ and the holding time $h_i$ of each class are defined such that $\rho_i = r_i h_i$ and the expectation value of the cumulative value of the random variable $X_i$ is:

$$E\left(\sum_{i=1}^{k} X_i\right) = \sum_{i=1}^{k} \rho_i p_i \quad \text{(EQN. 16)}$$

The Entropy Rate Function $$I_{\sum_{i=1}^{k} X_i}(C)$$

for multi-class traffic $$\sum_{i=1}^{k} X_i$$

is an estimate of the negative logarithm of the saturation probability:

$$-\ln\left(\sum_{i=1}^{k} X_i \geq C\right) > I_{\sum_{i=1}^{k} X_i}(C) \quad \text{(EQN. 17)}$$

where k is the number of traffic classes and C is the capacity allocated to the VP carrying this aggregated multi-class traffic.

The following relation expresses a general property of the Entropy Rate Function that is valid for all distributions:

$$I_{\sum_{i=1}^{k} X_i}\left(E\left(\sum_{i=1}^{k} X_i\right)\right) = I_{\sum_{i=1}^{k} X_i}\left(\sum_{i=1}^{k} \rho_i p_i\right) = 0 \quad \text{(EQN. 18)}$$

It can likewise be shown that $$I_{\sum_{i=1}^{k} X_i}(C)$$

is convex in C.

The log moment generating function for multi-class Poisson traffic is given by the relation:

$$\mu(s) = \sum_{i=1}^{k} \rho_i(e^{sp_i} - 1) \quad \text{(EQN. 19)}$$

Since the Entropy Rate Function has the general form:

$$I_X(C(s)) = \sup_s (sC - \mu_X(s)) = s\frac{d}{ds}\mu_X(s) - \mu_X(s) \quad \text{(EQN. 20)}$$

the Entropy Rate Function for multi-class traffic can be expressed in terms of the shift parameter, s, as:

$$I_{\sum_{i=1}^{k} X_i}(C(s)) = \sum_{i=1}^{k} (s\rho_i p_i e^{sp_i} - \rho_i(e^{sp_i} - 1)) \quad \text{(EQN. 21)}$$

where the allocated capacity, C, can further be functionally related to the shift parameter, s, as:

$$C(s) = \frac{d}{ds}\mu(s) = \sum_{i=1}^{k} \rho_i p_i e^{sp_i} \quad \text{(EQN. 22)}$$

The replacement of the single-class entropy measure with the multi-class entropy measure makes the problem analytically more complicated because the entropy measure can no longer be expressed explicitly in terms of the allocated capacity, C. This complication is due to the fact that the shift parameter, s, cannot be eliminated from Equation (EQN. 22).

However, since Equation (EQN. 21) expresses the Entropy Rate Function in terms of the shift parameter, s, we can vary s instead of varying C. Thus the capacity value can be computed at each iterative step of the algorithm by using Equation (EQN. 22). It should be noted that the zero value of s corresponds to the zero value of the entropy measure. The dimensioning algorithm is initialized by setting s to zero for all VPs.

The Entropy Rate Function For Normally Distributed Traffic

The Entropy Rate Function can also be used with other traffic models than those based on Poissonian offered traffic distributions. Two other important traffic models are discussed below. The first traffic model is based on the Entropy Rate Function for a normal distribution of offered traffic. Corresponding expressions for the Entropy Rate Function are derived for this traffic model. The second traffic model is based on the Entropy Rate Function derived from actual traffic flow measurements rather than on explicit assumptions about the distribution of the offered traffic.

The Entropy Rate Function for normally distributed traffic has been shown, see R. S. Ellis, Entropy, *Large Deviations and Statistical Mechanics* 39 (Springer-Verlag, 1985), to be defined by the following expression:

$$I_X(C) = \frac{(C-m)^2}{2\sigma^2} \quad \text{(EQN. 23)}$$

where m is the mean and σ is the variance of the normal distribution N(m, σ). Further, $$s(C) = \frac{C-m}{\sigma^2} \quad \text{(EQN. 24)}$$

These two relations yield the following simple expression for the Entropy Rate Function directly in terms of the control parameter, s:

$$I_X(C(s)) = \frac{\sigma^2}{2} s^2 \quad \text{(EQN. 25)}$$

Thus in the case of normally distributed traffic, the Entropy Rate Function is shown to be a simple (and convex) quadratic function.

The Entropy Rate Function For Measured Traffic

Since the diversity of services that will be provided in the networks of the future will be considerably greater than those available today, it is very likely that future broadband networks will experience huge variations in the types of traffic offered to the network. Consequently, all models that are based upon assumptions about specific idealized representations of the traffic distribution are likely to be inadequate because of their inherent inflexibility. Using an Entropy Rate Function derived from traffic measurements may provide one solution to this difficult traffic model estimation problem.

The traffic models that were discussed up to now had been defined on the call-level time scale. In contrast, traffic measurement statistics are defined on the time scale of a standard ATM cell. The call-level time scale can be considered to be an approximation of the cell-level time scale. Randomly changing traffic demand during a call can thus be abstracted by one or more parameters describing constant bandwidth demand on the call-level time scale.

It has recently been suggested that the Entropy Rate Function can be estimated from traffic measurements on the cell level. See, e.g., N. G. Duffield et al., Entropy of ATM Traffic Streams: *A Tool for Estimating QoS Parameters* (Dublin Institute for Advanced Studies, 1994).

Effect Of Traffic Overload On The Entropy Rate Function

The interpretation of the Entropy Rate Function as a blocking measure, works well if the average offered traffic on each physical link is lower than the corresponding available physical capacity on that link, i.e., if $E(X_k) < C_{phys}$. However, this condition may be violated in some realistic overload situations. Consider the following example based on homogeneous Poisson traffic and time-congestion blocking measure (i.e., the Erlang blocking formula).

TABLE 2 lists three values of allocated capacities and corresponding traffic demands that were calculated for a fixed blocking value of 0.03. Note that in the last case, the offered traffic is larger than the allocated capacity, even though the blocking is relatively low.

TABLE 2

| ALLOCATED CAPACITY | AVERAGE OFFERED TRAFFIC |
|---|---|
| 15.45 | 10 |
| 109.29 | 100 |
| 699.00 | 700 |

This example shows that the entropy blocking measure needs to be extended to cover the overload situation when the condition $E(X_k) < C_{phys}$ is violated. Mathematically, such an extension can be accomplished easily. As shown previously, the Entropy Rate Function is a convex function having a minimum value of zero at $E(X_k)$. The left branch of the Entropy Rate Function defines the overload region (see FIGS. 10 and 11). In this region, an increase in the Entropy Rate Function corresponds to a decrease in the allocated capacity and to negative values of the control parameters. By changing the sign of the control parameter, Push Down algorithm based on the Entropy Rate Function can be easily extended to cover the overload region. Such an extension requires only a minor modification of the original dimensioning algorithm.

The problem that remains is largely conceptual in nature, namely how to interpret this extension. The left branch region of the Entropy Rate Function corresponds to the approximation of the left tail of the probability mass:

$$-\ln P(X \leq C) \geq I_X(C(-s)) \quad \text{(EQN. 26)}$$

and can be interpreted as an entropy measure of the utilization of the allocated capacity, C.

Since in the initial state, the resources that were allocated exceeded the capacities of the physical resources, i.e., $E(X_k) \geq C^k_{phys}$, consequently, the utilization has to be decreased as it corresponds to an increase in the Entropy Rate Function.

One interpretation of the objectives of the optimization in the overload region can be as follows. To improve the uniformity of the distribution of entropy utilization measures in this region, the largest consumer of resources (i.e., the VP having the lowest entropy) is identified and the utilization of this extreme representative is decreased. Decreasing utilization of the largest consumer corresponds to an increased Entropy Rate Function in the overload region. Thus, this approach corresponds to a maxi min formulation of the optimization problem. It should be noted that the constraint conditions are now applied by starting with values that initially fall in the overload region.

Here again, we can use the correspondence of the uniform distribution of the entropy utilization measures to the best utilization of resources can be used (even if the best utilization is infeasible). Following the same reasoning as for the right branch region, to satisfy the constraint conditions, the entropy utilization measure is made uniform on each critical link. Further, the capacities of all VPs traversing the critical link are allocated in such a way that the entropy utilization values of these VPs are made equal.

As discussed earlier, the objective of the optimization in the right side region of the entropy curve was to increase the capacity allocated to the VP having the highest blocking (i.e., the VP with the least entropy blocking measure). This corresponds to a maxi min formulation of the optimization problem. It should be noted that the optimization objective for the left side region can be transformed to an optimization problem for the right side region by replacing the term "utilization" by the term "blocking" and the term "Largest consumer of resources" by the term "VP with the largest blocking" in the earlier formulated optimization objective for the left side region.

These two different formulations of the optimization objective for the left and the right branch of the Entropy Rate Function result in the same optimization procedure. In both cases the Entropy Rate Function needs to be increased. This can be accomplished by increasing the absolute value of the control parameter, s. If the load does not exceed the resources available, then the shift parameter will be positive and the capacities allocated to the various virtual paths can be successively raised until all the available physical resources are allocated. If, on the other hand, the load exceeds the resources available, then the shift parameter is negative. In such cases, the allocated capacities need to be gradually decreased until they come within the physical resource constraints.

VP Dimensioning Algorithm Using The Entropy Rate Function

Figure 12B:
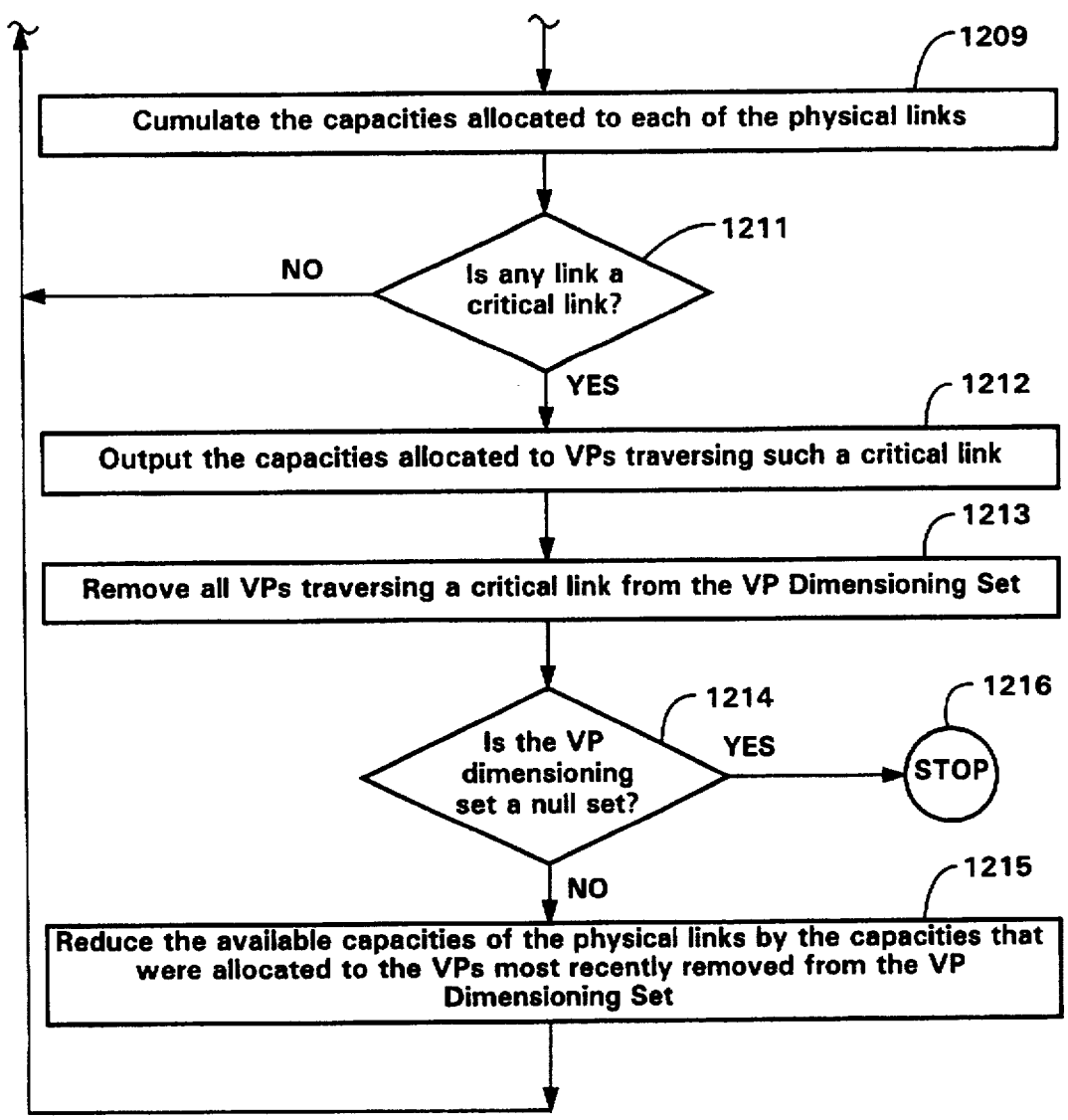
FIG. 12 is a flow chart depicting the various steps of a Virtual Path dimensioning algorithm using the Entropy Rate Function that is related to the present invention.

We can apply the above-detailed characteristics of the Entropy Rate Function to solve the VP dimensioning problem efficiently. As explained earlier, the VP dimensioning problem aims at allocating limited physical network resources amongst a plurality of predefined VPs given an offered traffic distribution. One embodiment of a VP dimensioning algorithm that uses the Entropy Rate Function as a blocking measure is shown in FIG. 12.

The process starts with a series of initialization steps 1202 to 1206. All of the VPs that are to be dimensioned are assembled into a VP dimensioning set at 1202. The transmission capacity constraints for each physical link in the network are specified at 1203. A set of upper limits, for the Entropy Rate Function, $I_{MAX}$, are optionally specified, one per virtual path, at 1204.

It should be noted that steps 1202 to 1204 may be performed in any order depending on implementation considerations. Further, $I_{MAX}$ is specified at 1204 only if there is a realistic likelihood of the offered traffic distribution having a truncated right tail i.e., only if $P(X>C)$ is zero for values of X that are greater than some finite value, $C_{MAX}$. If an offered traffic distribution has a truncated right tail, then it is theoretically possible to size network resources to achieve zero blocking. However, such situations are rare in practice.

Other initialization steps include the selection of large and equal blocking values for each of the Virtual Paths at 1205. As explained elsewhere, there is an inverse relationship between the values of the Entropy Rate Function and the corresponding blocking on a VP. Consequently, large blocking values correspond to small values of the Entropy Rate Function. Using the relations developed earlier, initial capacity allocations for the various VPs are also computed at 1205.

At 1206, these initial capacity allocations are cumulated over each physical link and compared to the prespecified transmission capacity of that physical link. If the initial allocations are such that there is overload on one or more of the physical links, then the computational steps that follow are modified to use formulae based on negative values of the shift parameter, s. This result follows from the fact that the algorithm for the overload situation corresponds to a reflection of the dimensioning problem to negative values of the shift parameter, s.

Another step implicit in the initialization process is to choose an offered traffic model, and if this model is not based on measurements, to derive the corresponding relations for the Entropy Rate Function, I, the allocated capacity, C, and the shift parameter, s. This step is not shown in FIG. 12.

After the initialization steps 1202 to 1206, the dimensioning technique performs recursive steps 1207 to 1215. The recursive technique outlined in FIG. 12 shows a two-level recursion wherein the VP dimensioning algorithm first iteratively allocates capacity to the VPs in the VP dimensioning set, as shown in 1207 to 1210, till one or more physical links reach full (i.e., 100%) utilization.

Physical links whose capacities are fully allocated are called critical links. Thus the net effect of steps 1207 to 1210 is to recursively identify critical links. While the critical link identification procedure is likely to identify only one physical link as a critical link at each stage of the iterative procedure, the algorithm, as implemented, is equally capable of identifying and processing more than one critical link at a given time.

In one embodiment of the present invention, the identification of critical links is done by incrementing, at 1207, the current Entropy Rate Function estimate by a fixed amount using a functional expression for the Entropy Rate Function that depends on the offered traffic model. Examples of such expressions can be found in Equation (EQN. 15) for homogenous Poissonian traffic, Equation (EQN. 21) for multi-class Poissonian traffic and Equations (EQN. 23 & EQN. 25) for normally-distributed traffic. It should be noted that an increment to the Entropy Rate Function Estimate may, occasionally be negative. This can happen if the dimensioning algorithm overshoots the optimal value and over allocates capacities.

The values of the shift parameter, s, are calculated at 1208 for each of the VPs in the dimensioning set. It should be noted that the shift parameter value represents the slope of the entropy-capacity graph of FIG. 10, for the corresponding VP. The incremental capacities to be allocated to the VPs in the dimensioning set is calculated at 1209 using the incremented values of the Entropy Rate Function. Steps 1207 to 1209 may be performed in a different sequence than that shown in the FIG. 12 based upon implementation considerations.

The capacities allocated to various VPs are then cumulated at 1210 for each of the physical links and compared in 1211 against the total capacity of that physical link. If the unallocated physical capacity of a link falls below a preset limit, then the link is determined to be a critical link.

If the comparison results in the identification of a physical link as a critical link, then the computation proceeds to 1212. If no physical link is found to be a critical link, then steps 1207 to 1210 or their equivalents are iteratively repeated until a critical link is found. In rare situations involving offered traffic models having a truncated right tail, it is possible that the iterative procedure is sometimes unable to identify any more critical links. In such situations, the calculation automatically terminates when the Entropy Rate Function reaches its maximum value, $I_{MAX}$, as specified at 1204.

After identifying a critical link, the VP dimensioning algorithm outputs the results and reformulates the problem as shown at 1212 to 1213. Every time one or more physical links are identified at 1211 to be critical links, the VP dimensioning algorithm proceeds to generate output, at 1212, detailing the currently allocated capacities on each of the VPs traversing a critical link. VPs traversing a critical link are removed from the dimensioning set at 1213. If no VPs remain to be dimensioned, then the dimensioning algorithm terminates at 1216.

If one or more VPs remain to be dimensioned, then the dimensioning set is redefined at 1215 to include only such VPs. Since the VPs traversing critical links were removed from the dimensioning set, and since these removed VPs used up part of the physical link capacities, the dimensioning task reduces to the distribution of the unallocated physical link capacities over the VPs still remaining in the dimensioning set. This is done at 1215 by reducing the available capacities of the various physical links by the amounts allocated to removed VPs that correspond to the critical links last found at 1211. In an alternative embodiment of the invention, the same effect is achieved by freezing the values of the Entropy Rate Function for VPs that have been eliminated from the VP dimensioning set. Since the capacities allocated to removed VPs were generated at 1212, this computation can be easily performed. After the reformulation of the problem at 1215, the algorithm loops back to 1207, and as before, the Entropy Rate Function is incremented by a fixed amount for all the VPs still remaining in the dimensioning set.

VP Dimensioning Using An Adaptive Search Technique

A method of improving the computational efficiency of the basic VP dimensioning algorithm over and above that obtainable by the use of the Entropy Rate Function as a blocking measure is presented below. This method is based on the general properties of the Entropy Rate Function and can be applied to any kind of traffic distribution model, including one based on actual traffic measurements.

The convergence of the basic VP dimensioning algorithm can be considerably speeded up by using an iterative linear approximation similar to the Newton-Raphson technique and taking advantage of the convexity of the Entropy Rate Function. When the demand perturbations on a virtual network are small, the adaptive VP dimensioning algorithm may be further refined using a linear approximation.

Virtual networks may occasionally be subject to perturbations. These perturbations can be caused by changes in the spatial traffic pattern, changes in traffic distribution, or by small changes in network operating parameters. Such changes may occur, for example, when multiple virtual networks are first defined on top of a single physical network and subsequently small amounts of physical resources are re-allocated between the differing virtual networks.

The "movable boundary" problem is a special case of the network dimensioning problem that is discussed in greater detail below.

The adaptive VP dimensioning technique builds upon the VP dimensioning techniques detailed earlier (in conjunction with the text accompanying FIGS. 9 and 12) and offers the greatest advantages over prior techniques in the final stages of dimensioning. To understand the critical elements of the adaptive technique, assume that the basic algorithm is used to obtain a near-optimal state where the capacities allocated to virtual paths are close to the limiting physical capacities of the critical link. In such cases, instead of using the iterative trial and error procedure of FIG. 12 to find the state yielding full utilization of each critical link while equalizing the load on the various VPs traversing the critical link, the basic dimensioning algorithm can be speeded up considerably by using the following general approximation:

$$\Delta I(C) \approx \Delta C \frac{dI(C)}{dC} = s\Delta C \qquad \text{(EQN. 27)}$$

This approximation follows from the following easily derivable general relation for the Entropy Rate Function:

$$\frac{dI(C)}{dC} = s \qquad \text{(EQN. 28)}$$

Next, we need to calculate the common increment to the Entropy Rate Function for link k at step t, $\Delta I_k^t$, so that $\Delta C_k^t$, the unallocated capacity of critical link k can be allocated amongst all VPs traversing this link. Let the incremental capacity allocated to the $i^{th}$ VP be denoted by $\Delta C_{k,i}^t$. Since $$\Delta C_{k,i} = \frac{\Delta I_k}{s_i}$$

at every iterative step t and $$\Delta C_k^t = \sum_i \Delta C_{k,i} = \Delta I_k^t \sum_i \left(\frac{1}{s_i}\right),$$

it follows that:

$$\Delta I_k^t = \frac{\Delta C_k^t}{\sum_i \frac{1}{s_i}} \qquad \text{(EQN. 29)}$$

The relation between each $\Delta I$ calculated from Equation (EQN. 29) and the corresponding $\Delta s$ values is:

$$\Delta I(C(s)) \approx \Delta s \frac{dI(C(s))}{ds} =$$

$$\Delta s \frac{dI(C)}{dC} \cdot \frac{dC(s)}{ds} = s \frac{d^2\mu(s)}{ds^2} \Delta s = sV(s)\Delta s$$

and thus, by substituting $C=\mu'(s)$ in the derivative $$\frac{dC(s)}{ds} = s$$

and by defining $$V(s) = \frac{d^2\mu(s)}{ds^2}$$

as the variance of the shifted distribution, we obtain the relation between $\Delta s$ and $\Delta I$ as:

$$\Delta s = \frac{\Delta I}{sV(s)} \qquad \text{(EQN. 30)}$$

Adaptive VP Dimensioning Algorithm

Equation (EQN. 29) can be used to estimate even large values of the Entropy Rate Function increment, $\Delta I_k^t$, as long as the instantaneous slopes of the Entropy Rate Function, $s_i^t$ are non-zero. Since the Entropy Rate Function is convex in C and C increases monotonically with s, $\Delta I_k^t$ will be underestimated by this calculation technique. Consequently, this procedure will stably converge if iterated.

Figure 13A:
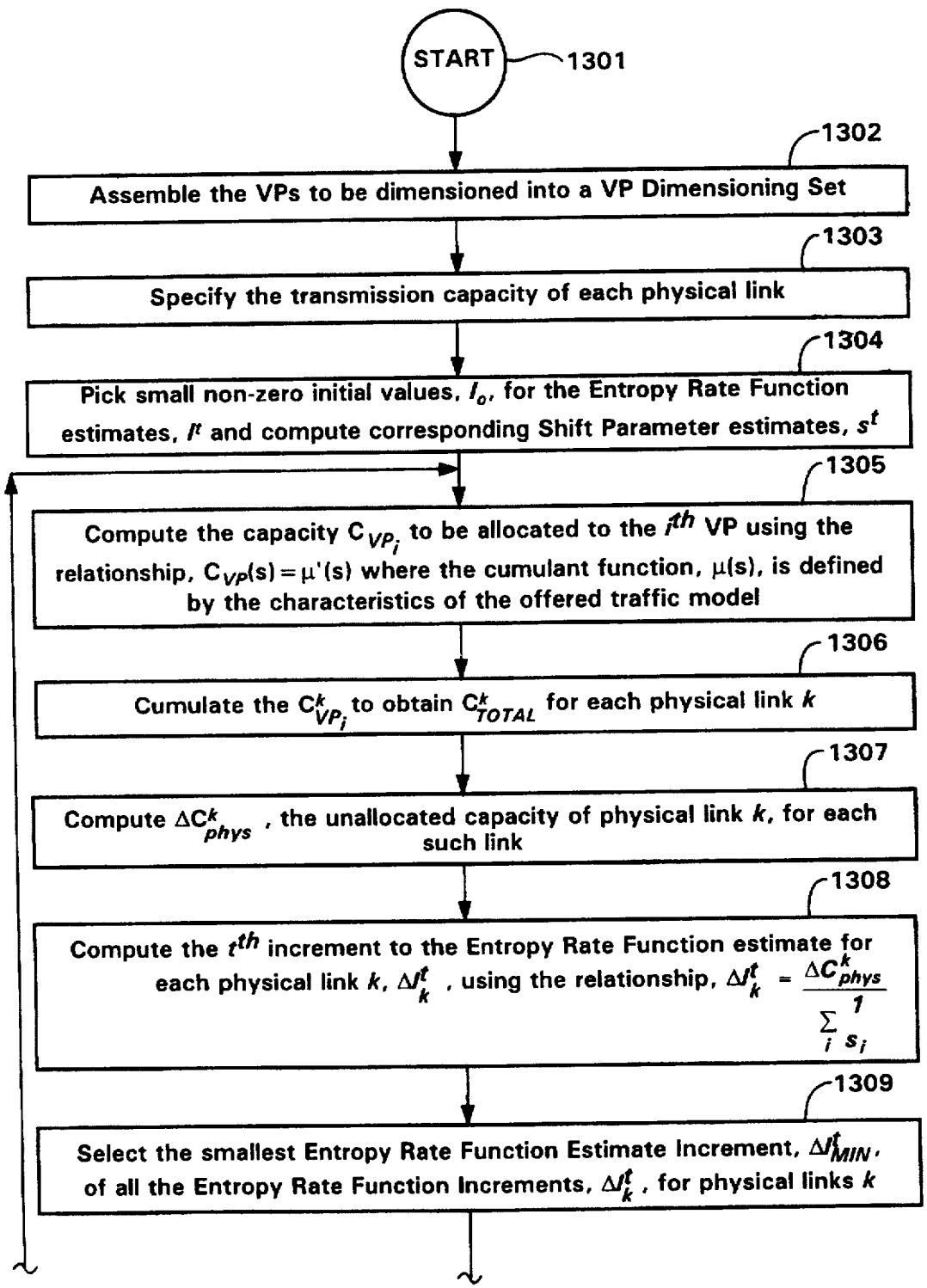
FIG. 13 is a flow chart depicting the successive steps in the adaptive dimensioning algorithm related to the present invention.
Figure 13B:
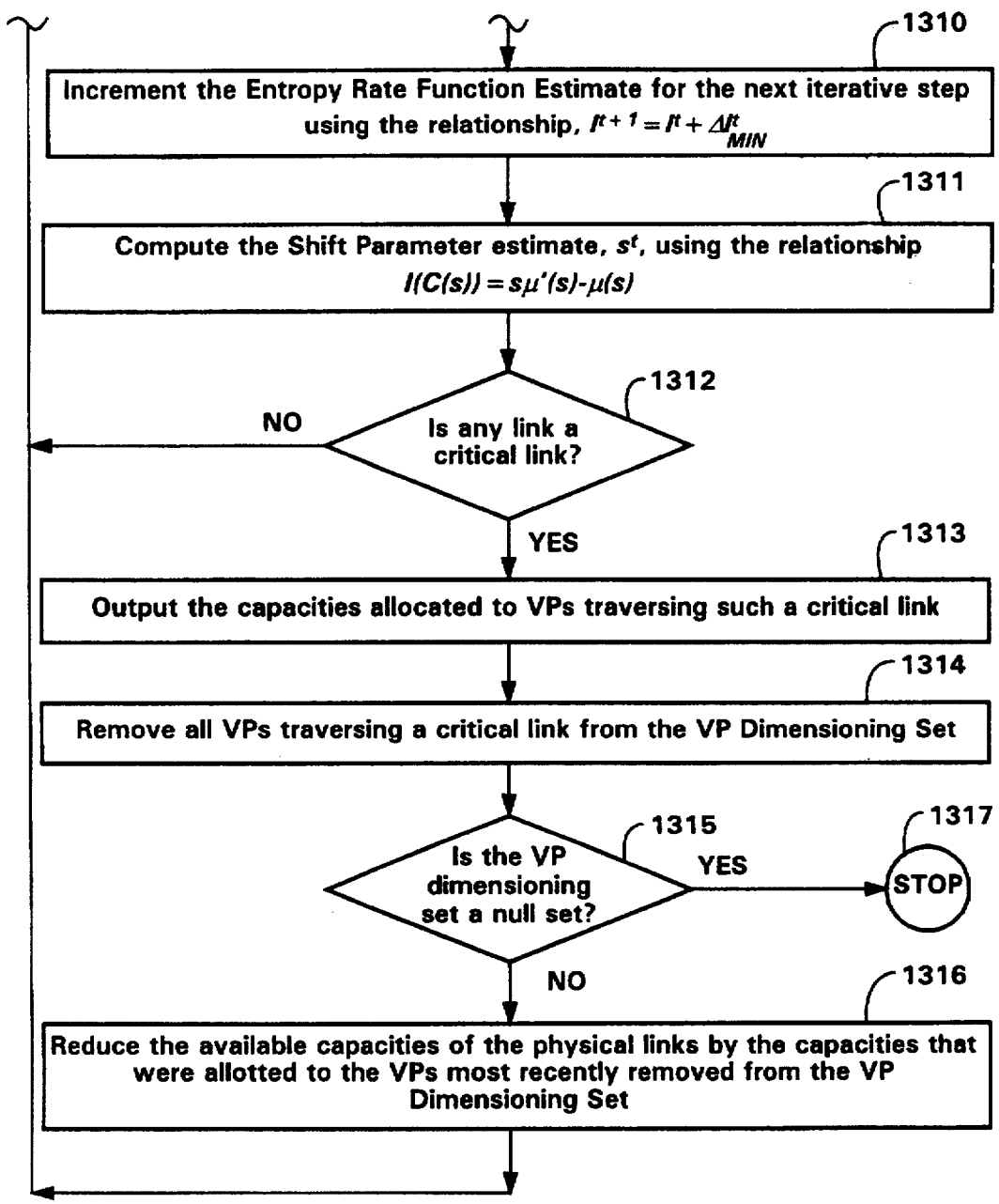

Another embodiment of a VP dimensioning algorithm that uses the Entropy Rate Function as a blocking measure is shown in FIG. 13. In contrast to the trial-and-error technique used in the basic VP dimensioning algorithm used in FIG. 12, this dimensioning technique uses an adaptive search technique that resembles, in some ways, the Newton-Raphson technique.

The adaptive VP dimensioning algorithm shown in FIG. 13 starts, as in the basic VP dimensioning algorithm of FIG. 12, with a series of initialization steps 1302 to 1304. The VPs that are to be dimensioned are assembled into a VP dimensioning set at 1302. The transmission capacity constraints for each physical link in the network are specified at 1303. An upper limit for the Entropy Rate Function, $I_{MAX}$, may also be optionally specified at this stage, as was done at 1204 in the basic entropy-based VP dimensioning algorithm of FIG. 12. As before, $I_{MAX}$ is specified only if there is a realistic likelihood of the offered traffic distribution having a truncated right tail.

It should be noted that initialization steps 1302 and 1303 may be performed in any order depending on implementation considerations. As before, the specification of $I_{MAX}$ at 1204 is done only if there is a realistic possibility that the offered traffic distribution has a truncated right tail. As in the basic entropy-based VP dimensioning algorithm, the initialization process implicitly includes choosing an offered traffic model and deriving the corresponding relations for the Entropy Rate Function, I, the allocated capacity, C, and the shift parameter, s. These are not shown in FIG. 13.

Other initialization steps include the selection, at 1304, of small and equal non-zero initial values for the set of Entropy Rate Function estimates and corresponding non-zero values of the transformed parameters, s. As explained earlier, these initial estimates correspond to large initial blocking values.

Like the basic entropy-based VP dimensioning algorithm, this VP dimensioning algorithm iteratively allocates capacity, as shown at 1305 to 1311 till one or more physical links reach full utilization. Whenever a physical link is determined, at 1312, to be a critical link, all VPs traversing this critical link are removed from the dimensioning set and the dimensioning problem is reformulated, as shown at 1313 to 1316.

The critical link identification procedure of the adaptive VP dimensioning algorithm of FIG. 13 is somewhat different as compared to the basic algorithm shown in FIG. 12. Using the relations developed earlier, capacity allocations for the various VPs, $C_{VP_i}^k$ are computed at 1305 for each of the physical links k. These initial capacity allocations are cumulated at 1306 over each physical link to obtain $C_{TOTAL}^k$ for each of the physical links. Each such total is compared to the transmission capacity of each physical link as specified at 1303 to determine, the unallocated capacity of each physical link, $\Delta C_{phys}^k$, at 1307.

If the initial allocations are such that there is overload on one or more of the physical links, then the computational steps that follow are modified, as in the basic model, to use formulae based on negative values of the shift parameter, s.

The increments to the Entropy Rate Function estimates for step t of the iteration, $\Delta I_k^t$, are calculated at 1308 for each of the physical links k, by using Equation (EQN. 29) and summing the inverse values of shift parameters over all VPs traversing the physical link. It should be noted that the computed value of the increment may be different for each of the physical links. The various increments to the Entropy Rate Function estimates for the various physical links are compared, at 1309, and the lowest value, $\Delta I_{MIN}^t$, is selected. The current Entropy Rate Function estimate, $I^t$, is then incremented at 1310 using the update equation:

$$I^{t+1}(s_i^{t+1}) = I^t(s_i^t) + \Delta I_{MIN}^t \qquad \text{(EQN. 31)}$$

The shift parameter estimate, s, can now be revised, at 1311, using the offered traffic model-dependent functional expression for the cumulant function, $\mu(s)$. The value of s is updated at 1311, using the relationship:

$$s_i^{t+1} = s_i^t + \Delta s_i \qquad \text{(EQN. 32)}$$

where Equation (EQN. 30) can be used to compute the changes in the transform parameter, $\Delta s_i$ whenever $s_i$ is small.

Iterative steps 1305 to 1311 are repeated until the unallocated capacity of at least one of the remaining physical links is reduced below some preset error or termination condition. When such a condition is determined at 1312, one or more physical links have been found to be critical links.

After detection of a critical link, the adaptive VP dimensioning algorithm operates identically to the basic algorithm, and the computation proceeds to 1313. If no physical link is found to be a critical link, then steps 1305 to 1311 or their equivalents are iteratively repeated until a critical link is found. In rare situations involving offered traffic models having a truncated right tail, the iterative procedure may sometimes be unable to identify any more critical links. In such situations, the calculation automatically terminates when the Entropy Rate Function reaches a preset maximum value, $I_{MAX}$.

Every time one or more physical links are identified at 1312 to be critical links, the VP dimensioning algorithm proceeds to generate output, at 1313, detailing the currently allocated capacities on each of the VPs traversing a critical link. VPs traversing a critical link are removed from the dimensioning set at 1314. If no VPs remain to be dimensioned at 1315, then the dimensioning algorithm terminates at 1317.

If one or more VPs remain to be dimensioned, then the dimensioning set is redefined at 1316 to include only such VPs. Since the VPs traversing critical links were removed from the dimensioning set, and since these removed VPs were allocated part of the physical link capacities, the dimensioning task reduces to the distribution of the unallocated physical link capacities over the VPs still remaining in the dimensioning set. This is done at 1316 by reducing the available capacities of the various physical links by the amounts allocated to removed VPs that correspond to the critical links last found at 1312. After the reformulation of the problem at 1316, the adaptive VP dimensioning algorithm loops back to 1305, and as before, capacity allocations are made to all the VPs still remaining in the dimensioning set.

Figure 14:
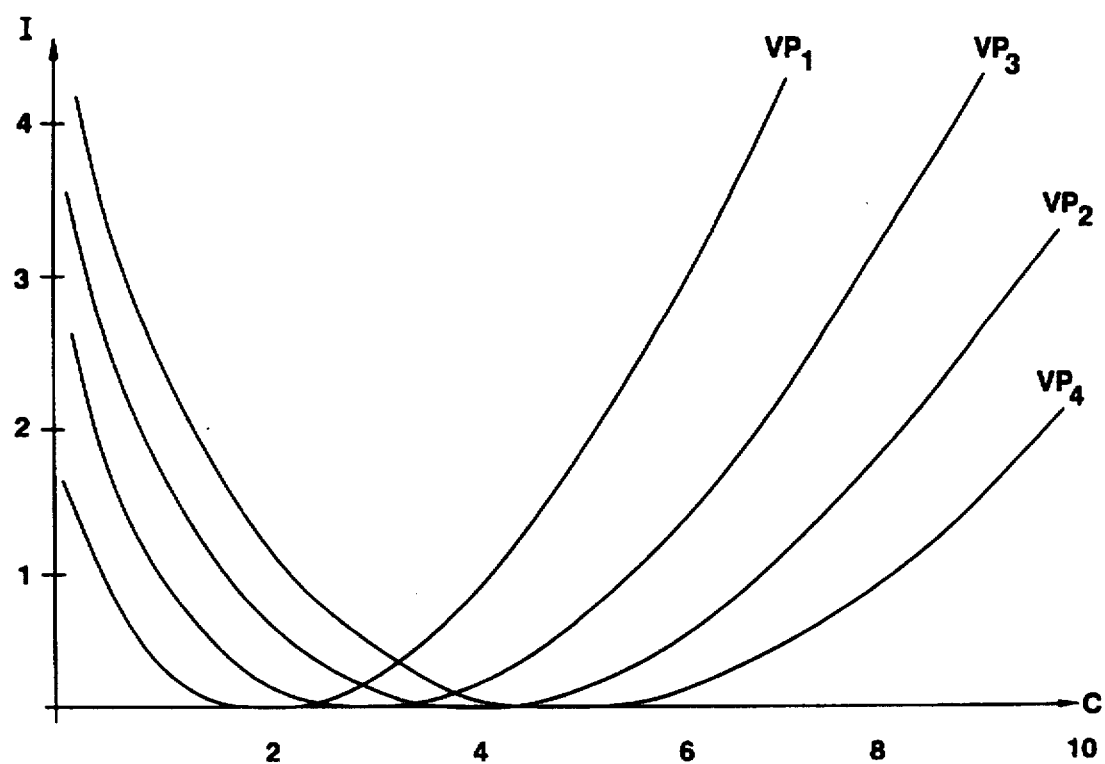
FIG. 14 is an exemplary illustration of the Entropy Rate Function for differing virtual paths.
Figure 15:
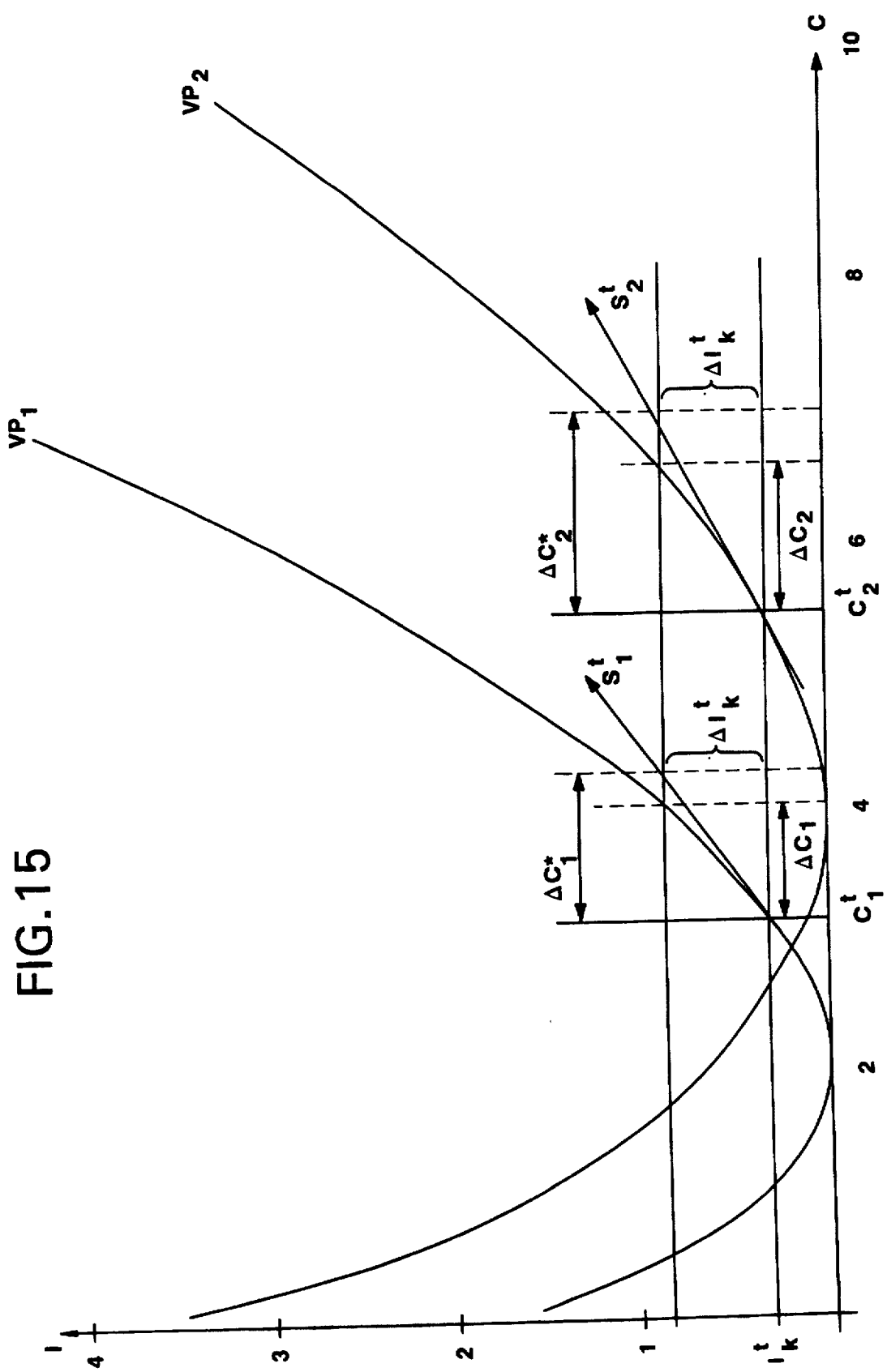
FIG. 15 is a diagram illustrating the computational steps of the adaptive dimensioning algorithm related to the present invention.

An intuitive understanding of the operation of the adaptive VP dimensioning algorithm may be obtained by reference to FIGS. 14 and 15. FIG. 14 illustrates the fact that different VPs may be characterized by different entropy-capacity curves, even if the VPs traverse a common physical link. As can be seen from FIG. 14, the entropy-capacity curves for different VPs have their minima at different values of allocated capacity. This result follows from the fact that the offered traffic on the different VPs shown are not the same. Consequently, each of the VPs have their minimum entropy point at different values of allocated capacities.

The capacity allocation procedure of the adaptive VP dimensioning algorithm is illustrated in FIG. 15 for a situation involving two virtual paths, $VP_1$ and $VP_2$ that traverse the same physical link. The procedure starts with the selection of a set of small non-zero initial values of the Entropy Rate Function, $I_k^t$. The corresponding capacities already allocated to $VP_1$ and $VP_2$ are $C_1^t$ and $C_2^t$ respectively. Tangents are then drawn on the entropy-capacity curves for $VP_1$ and $VP_2$ at the coordinates, $(C_1^t, I_k^t)$ and $(C_2^t, I_k^t)$, respectively. These tangent lines are indicated by the reference characters $s_1^t$ and $s_1^t$ in FIG. 15 and correspond to the current iterative estimates for the shift parameters of these virtual paths.

The unallocated capacity at the start of the $t^{th}$ iteration, $\Delta C_k^t$, is equal to the difference between the total capacity, $\overline{C}_{phys}^k$, and the sum of the capacities already allocated, $C_1^t$ and $C_2^t$. Further, as the slopes $s_1^t$ and $s_2^t$ are known, the increment to the Entropy Rate Function estimate, $\Delta I_k^t$, can be computed using Equation (EQN. 29) as:

$$\Delta I_k^t = \frac{\overline{C}_{phys}^k - (C_1^t + C_2^t)}{\frac{1}{s_1^t} + \frac{1}{s_2^t}} \quad \text{(EQN. 32A)}$$

When $\Delta C_i$ is small, $\Delta C_i^t (= C_i^{t+1} - C_i^t)$ can be calculated directly from $\Delta I_k^t$ and $\Delta s_i^t$ using Equation (EQN. 27). In other situations, a model-dependent functional expression is used to calculate the link-dependent increment to the Entropy Rate Function estimates, $\Delta I_k^t$.

The minimum of the increments $\Delta I_k^t$ over the K physical links, $\Delta I_{MIN}^t$, is then identified and used to increment the Entropy Rate Function estimate. Needless to say, the Entropy Rate Function is incremented by the same amount for all physical links. The corresponding incremental capacity allocations for $VP_1$ and $VP_2$ are $\Delta C_1^t$ and $\Delta C_2^t$.

The Entropy Rate Function estimate, $I_k^t$, is then incremented by this value of $\Delta I_{MIN}^t$ to yield $I_k^{t+1}$. It should be noted that we do not calculate a different $I_k^{t+1}$ for each of the physical links, but instead use $\Delta I_{MIN}^t$ as the common increment to the prior estimate of the Entropy Rate Function. The inverse relation for the Entropy Rate Function is used to determine the capacities, $C_1^{t+1}$ and $C_2^{t+1}$, to be allocated to virtual paths $VP_1$ and $VP_2$ and simultaneously to determine the new slopes, $s_1^{t+1}$ and $s_2^{t+1}$. This iterative procedure is then repeated to obtain the next increment, $\Delta I_k^{t+1}$, to the Entropy Rate Function estimate.

The computation procedure is stable because $\Delta I_k^t$ is underestimated. This is because, as shown in FIG. 15, the allocated capacity increments, $\Delta C_1^t$ and $\Delta C_2^t$, are smaller than the values, $\Delta C_1^*$ and $\Delta C_2^*$, respectively, that are used at each iterative level for calculating $\Delta I_k^t$.

Deriving Other Operating Parameters From The Entropy Rate Function

In some contexts, a network operator may wish to specify network parameters such as blocking of allocated resources in terms that are different from the entropy measure. On the call-level time scale, the most common measure for the specification of blocking performance for Poisson offered traffic is the time congestion measure based on the Erlang blocking formula.

The Erlang blocking formula, $E(\rho, C)$ characterizes blocking as a function of two parameters: the load, $\rho$, and the allocated capacity, C. Since a dimensioning technique based upon an entropy measure has been found to be much speedier than other dimensioning methods, the most efficient way to calculate the final value of the time congestion measure is to use the entropy measure to obtain the optimal values of the allocated capacities and then to calculate the Erlang blocking by using the optimal values of these capacities and the known values of the traffic load.

The same approach can also be used for other blocking measures such as the time-congestion blocking measures for multi-class (i.e., non-homogeneous) Poisson traffic. If the use of other blocking measures for dimensioning purposes results in complex and inefficient dimensioning algorithms, then either of the basic VP dimensioning algorithm using the Entropy Rate Function as a blocking measure or the adaptive VP dimensioning algorithm can be used instead.

Comparative Results Using The Entropy Rate Function

Figure 16:
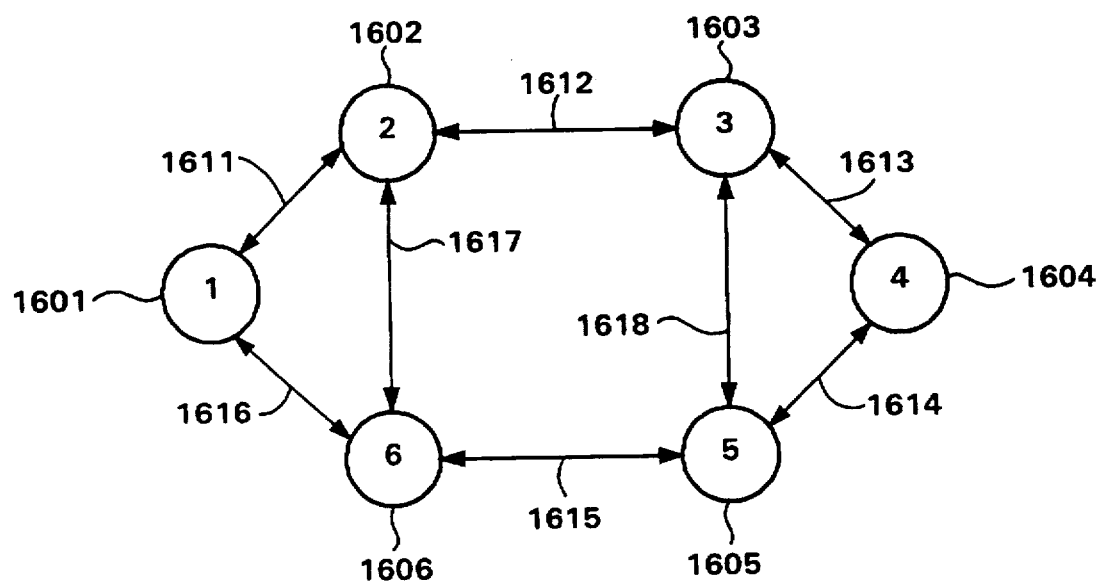
FIG. 16 is a diagram showing an exemplary physical network having six nodes.

The technique described above can be better understood by considering the following example. FIG. 16 shows an exemplary physical network having 6 nodes, labeled 1601 to 1606. As shown in FIG. 16, Node 1601 is connected to Nodes 1602 and 1606 through Links 1611 and 1616 respectively while Node 1604 is connected to Nodes 1603 and 1605 through Links 1613 and 1614 respectively. Nodes 1602 and 1605 are further connected to Nodes 1603 and 1606 through Links 1612, 1615, 1617 and 1618. The links of the physical network are assumed to be capable of carrying bi-directional traffic. However, the virtual paths defined on this physical network are assumed to be uni-directional.

Figure 17:
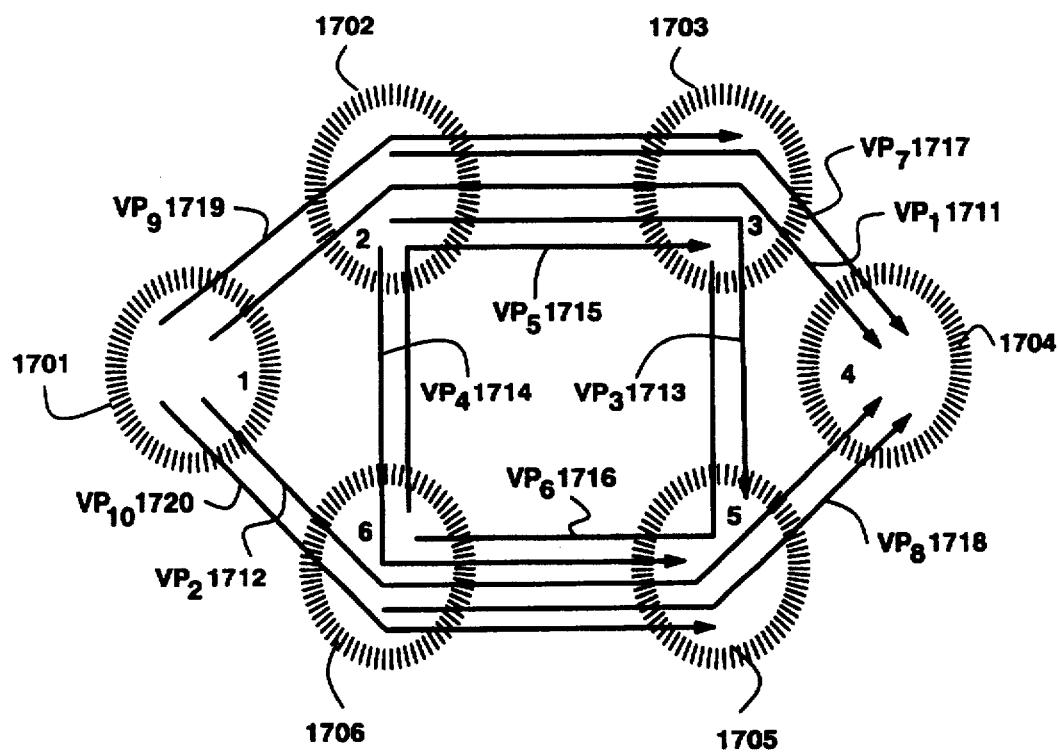
FIG. 17 is a diagram showing the connection topology of ten virtual paths defined on the six-node network of FIG. 16.

TABLE 3, set forth below, defines the routing of ten different virtuaL paths, $VP_1$ to $VP_{10}$, on this exemplary six-node physical network. Thus, for example, virtual path $VP_3$ runs from Node 1602 to Node 1605 via Node 1603. The connection topology of these virtual paths is illustrated in FIG. 17. Nodes 1701 to 1706 of FIG. 17 correspond to Nodes 1601 to 1606 of FIG. 16. Virtual path $VP_3$ 1713 is shown to run from Node 1702 to Node 1705 via Node 1703. In the example being considered, the transmission capacities of each of the eight physical links 1611 to 1618 of FIG. 16 are assumed to be 50 units of transmission capacity. The unit transmission capacity of each of the physical links can be selected arbitrarily, e.g., 20 megabits per second.

TABLE 3

| $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|
| 1-2-3-4 | 1-6-5-4 | 2-3-5 | 2-E-5 | E-2-3 | 6-5-3 | 2-3-4 | 6-5-4 | 1-2-3 | 1-6-5 |

Consider first, a situation wherein the offered traffic is homogenous. The top row of TABLE 4 shows the traffic demand for the ten virtual paths, $VP_1$ through $VP_{10}$. As can be seen, this represents a situation where the distribution of traffic demand among physical links is homogenous because the traffic demand variation between the differing virtual paths is relatively low and further, is relatively continuous, rather than bimodal or multi-modal. The dimensioning results achieved by three different algorithms are listed in TABLE 5.

TABLE 4 also shows the blocking probability using the Erlang blocking formula for the three algorithms as calculated from the allocated capacities according to Algorithm III. It can be seen by comparing the dimensioning results of Algorithms II and III that the dimensioning results using Algorithm II (the Push Down algorithm using the Erlang blocking measure) are close to those obtained using Algorithm III (the adaptive dimensioning algorithm using the Entropy Rate Function). Consequently, it is clear that the dimensioning problem is insensitive to the choice of the blocking measure.

TABLE 4

|  | $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|---|
| TRAFFIC DEMAND | 4 | 6 | 3 | 1 | 6 | 4 | 3 | 6 | 5 | 2 |
| VIRTUAL PATH CAPACITY | | | | | | | | | | |
| ALGORITHM I | 9.69 | 13.64 | 7.99 | 5.10 | 12.86 | 10.44 | 7.99 | 13.64 | 11.24 | 7.16 |
| ALGORITHM II | 9.75 | 13.53 | 8.19 | 5.29 | 12.64 | 10.50 | 8.19 | 13.53 | 11.18 | 7.11 |
| ALGORITHM III | 9.72 | 13.83 | 8.07 | 4.79 | 12.82 | 10.59 | 8.07 | 13.83 | 11.30 | 6.96 |
| ERLANG BLOCKING PROBABILITY (%) | | | | | | | | | | |
| ALGORITHM I | 0.623 | 0.330 | 0.863 | 0.443 | 0.607 | 0.388 | 0.863 | 0.330 | 0.715 | 0.350 |
| ALGORITHM II | 0.743 | 0.366 | 0.743 | 0.366 | 0.743 | 0.366 | 0.743 | 0.366 | 0.743 | 0.366 |
| ALGORITHM III | 0.768 | 0.275 | 0.818 | 0.890 | 0.635 | 0.338 | 0.818 | 0.275 | 0.689 | 0.439 |

TABLE 5

| LINK | $C_{1-2}$ | $C_{2-6}$ | $C_{1-6}$ | $C_{2-3}$ | $C_{6-5}$ | $C_{3-5}$ | $C_{3-4}$ | $C_{5-4}$ |
|---|---|---|---|---|---|---|---|---|
| LINK CAPACITY | 50 | 50 | 50 | 50 | 50 | 50 | 50 | 50 |
| LINK UTILIZATION (%) | | | | | | | | |
| ALGORITHM I | 42.28 | 35.92 | 41.60 | 100 | 100 | 36.96 | 35.78 | 54.56 |
| ALGORITHM II | 41.86 | 35.88 | 41.28 | 100 | 100 | 37.40 | 35.88 | 54.14 |
| ALGORITHM III | 42.04 | 35.22 | 41.58 | 100 | 100 | 37.31 | 35.58 | 55.32 |

Algorithm I is a convex programming based algorithm whose objective is to maximize the total carried traffic calculated through the Erlang blocking formula. This algorithm is of the type described in A. Faragó, S. Blaabjerg, W. Holender, T. Henk and S. Malomsoky, *Optimal Virtual Path Bandwidth Management*, a conference preprint that was submitted in May 1994 to ISS'95, which is hereby incorporated by reference herein. Algorithm II is a Push Down algorithm using an Erlang blocking measure of the type described earlier. Algorithm III is the entropy-based VP dimensioning algorithm also previously described.

In order to make the results of the three algorithms comparable, the bandwidth demand parameter, p, was set to have unit value for all three algorithms. Further, the traffic demands, p, were also assumed to have values lower than the physical capacities of the various links.

TABLE 5 presents the corresponding results for link utilization for the various virtual paths. As can be seen from TABLE 5, the $C_{2-3}$ and the $C_{6-5}$ links corresponding to physical links 1612 and 1615 respectively, are critical links, as the utilization rates of these physical links is 100%.

TABLE 6 presents two global performance parameters that both characterize as well as permit the comparison of the three algorithms: the maximum VP blocking probability and the total carried traffic.

TABLE 6

| COMPARISON | ALGORITHM I | ALGORITHM II | ALGORITHM III |
|---|---|---|---|
| MAXIMUM VP BLOCKING PROBABILITY (%) | 0.8639 | 0.7437 | 0.8901 |
| TOTAL CARRIED TRAFFIC | 39.7843 | 39.7748 | 39.7834 |

The performance of the same three algorithms has also been investigated for traffic patterns having a large divergence of traffic demands between the various virtual paths. A comparative tabulation of allocated VP capacity for heterogenous traffic demand resulting in low blocking can be seen in TABLE 7. As is shown in the top row of TABLE 7, the offered traffic on virtual path $VP_1$ is significantly different from that on virtual paths $VP_2$ to $VP_{10}$.

TABLE 7

|  | $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|---|
| TRAFFIC DEMAND | 12 | 1 | 1 | 1 | 2 | 2 | 1 | 2 | 1 | 2 |
| | | | | VIRTUAL PATH CAPACITY | | | | | | |
| ALGORITHM I | 23.80 | 5.73 | 5.73 | 5.73 | 8.00 | 8.00 | 5.73 | 8.00 | 5.73 | 8.00 |
| ALGORITHM II | 23.89 | 8.47 | 5.98 | 8.47 | 8.15 | 10.99 | 5.98 | 10.99 | 5.98 | 10.99 |
| ALGORITHM III | 24.81 | 8.21 | 5.69 | 8.21 | 8.09 | 11.19 | 5.69 | 11.19 | 5.69 | 11.19 |

The corresponding comparison results for link utilization on the 10 virtual paths for the three algorithm are presented in TABLE 8 for the same three algorithms as those considered earlier. As can be seen physical links 1612 and 1618 are critical links when Algorithms II and III are used for dimensioning the network. The comparison of the global performance evaluation parameter for the three algorithms is shown in TABLE 9. The results tabulated in TABLES 7, 8 and 9, illustrate a situation where heterogeneous traffic demand results in low blocking.

TABLE 8

| LINK | $C_{1-2}$ | $C_{2-6}$ | $C_{1-6}$ | $C_{2-3}$ | $C_{6-5}$ | $C_{3-5}$ | $C_{3-4}$ | $C_{5-4}$ |
|---|---|---|---|---|---|---|---|---|
| LINK CAPACITY | 50 | 50 | 50 | 50 | 50 | 50 | 50 | 50 |
| | | | LINK UTILIZATION (%) | | | | | |
| ALGORITHM I | 59.1 | 27.5 | 27.5 | 98 | 71 | 27.5 | 59.1 | 27.5 |
| ALGORITHM II | 59.8 | 33.3 | 38.9 | 100 | 100 | 34.0 | 59.8 | 38.9 |
| ALGORITHM III | 61.0 | 32.6 | 38.8 | 100 | 100 | 33.8 | 61.0 | 38.8 |

TABLE 9

| COMPARISON | ALGORITHM I | ALGORITHM II | ALGORITHM III |
|---|---|---|---|
| TOTAL CARRIED TRAFFIC (ΣDEMAND = 25) | 24.971 | 24.985 | 24.986 |

In contrast, TABLES 10, 11 and 12 illustrate a situation where heterogeneous offered traffic results in high blocking. TABLE 10 presents results for allocated capacities for the traffic demand shown on the top row. TABLE 11 presents the corresponding link utilization results for the 10 virtual paths. TABLE 12 summarizes a comparative analysis of the three algorithms using the total carried traffic as a global performance evaluation parameter.

TABLE 10

|  | $VP_1$ | $VP_2$ | $VP_3$ | $VP_4$ | $VP_5$ | $VP_6$ | $VP_7$ | $VP_8$ | $VP_9$ | $VP_{10}$ |
|---|---|---|---|---|---|---|---|---|---|---|
| TRAFFIC DEMAND | 16 | 2 | 3 | 20 | 19 | 2 | 4 | 2 | 1 | 2 |
| | | | | VIRTUAL PATH CAPACITY | | | | | | |
| ALGORITHM I | 18.00 | 5.25 | 3.99 | 28.97 | 21.02 | 5.25 | 4.99 | 5.25 | 1.99 | 5.25 |
| ALGORITHM II | 16.98 | 5.65 | 4.75 | 27.37 | 19.71 | 5.65 | 5.73 | 5.65 | 2.82 | 5.65 |
| ALGORITHM III | 18.11 | 5.09 | 3.94 | 28.69 | 21.30 | 5.09 | 5.08 | 5.09 | 1.56 | 5.09 |

TABLE 11

| LINK | $C_{1-2}$ | $C_{2-6}$ | $C_{1-6}$ | $C_{2-3}$ | $C_{6-5}$ | $C_{3-5}$ | $C_{3-4}$ | $C_{5-4}$ |
|---|---|---|---|---|---|---|---|---|
| LINK CAPACITY | 50 | 50 | 50 | 50 | 50 | 50 | 50 | 50 |
| | | | LINK UTILIZATION (%) | | | | | |
| ALGORITHM I | 40.0 | 100 | 21.0 | 100 | 100 | 18.5 | 46.0 | 21.0 |
| ALGORITHM II | 39.6 | 94.2 | 22.6 | 100 | 100 | 20.8 | 45.4 | 22.6 |
| ALGORITHM III | 39.4 | 100 | 20.4 | 100 | 98.1 | 18.1 | 46.4 | 20.4 |

TABLE 12

| COMPARISON | ALGORITHM I | ALGORITHM II | ALGORITHM III |
|---|---|---|---|
| TOTAL CARRIED TRAFFIC (ΣDEMAND = 71) | 64.8137 | 64.2233 | 64.6251 |

As can be seen from TABLES 6, 9 and 12, the three algorithms yield very similar results in terms of their global performance.

Dimensioning of Virtual Networks

The VP dimensioning problem can be generalized to a virtual network dimensioning problem because a virtual path is a special case of a virtual network. This generalization is important from a practical point of view since there are many applications of the virtual network concept. For example, differing services may be offered on different virtual networks. Some users may require proprietary virtual networks providing guaranteed Quality of Service (QoS) parameters. Others may ask for virtual networks providing certain levels of transmission resources and security that require them to be separated from other virtual networks. To provide these services, one would need to solve a VN dimensioning problem.

The virtual network concept is also applicable to situations where a telecommunications operator resells transmission capacity that was purchased from another operator. The first operator may want to allocate the purchased transmission capacity amongst its customers in such a way as to maximize revenue or to maintain QoS standards. In order to do this, the first operator would need to dimension its leased virtual network. Customers of a reseller may, in turn, be resellers at a lower level. Thus, for example, a large organization that purchases a significant amount of transmission capacity using long-term contracts, may wish to reallocate capacity amongst organizational divisions based upon changes in divisional traffic demands. This reallocation is a VN dimensioning problem.

Another simple example applying the virtual network concept relates to the transfer of Internet Protocol (IP) packets over an ATM network. One way to do this would be to allocate a set of VPs over an ATM network to accomplish connection-oriented transfer of packets. However, it can be seen that by allocating a virtual network rather than a mere set of virtual paths, different packets can be routed through different paths in this virtual network. This connection-less transfer mode will provide an additional multiplexing gain over that achieved by the connection-oriented technique.

Abstraction Model For The VN Dimensioning Problem

The description of the entire dimensioning problem can be decomposed into a multi-layered representation which permits the dimensioning problem to be described on each layer in a form that is independent of the description in the other layers.

Figure 18:
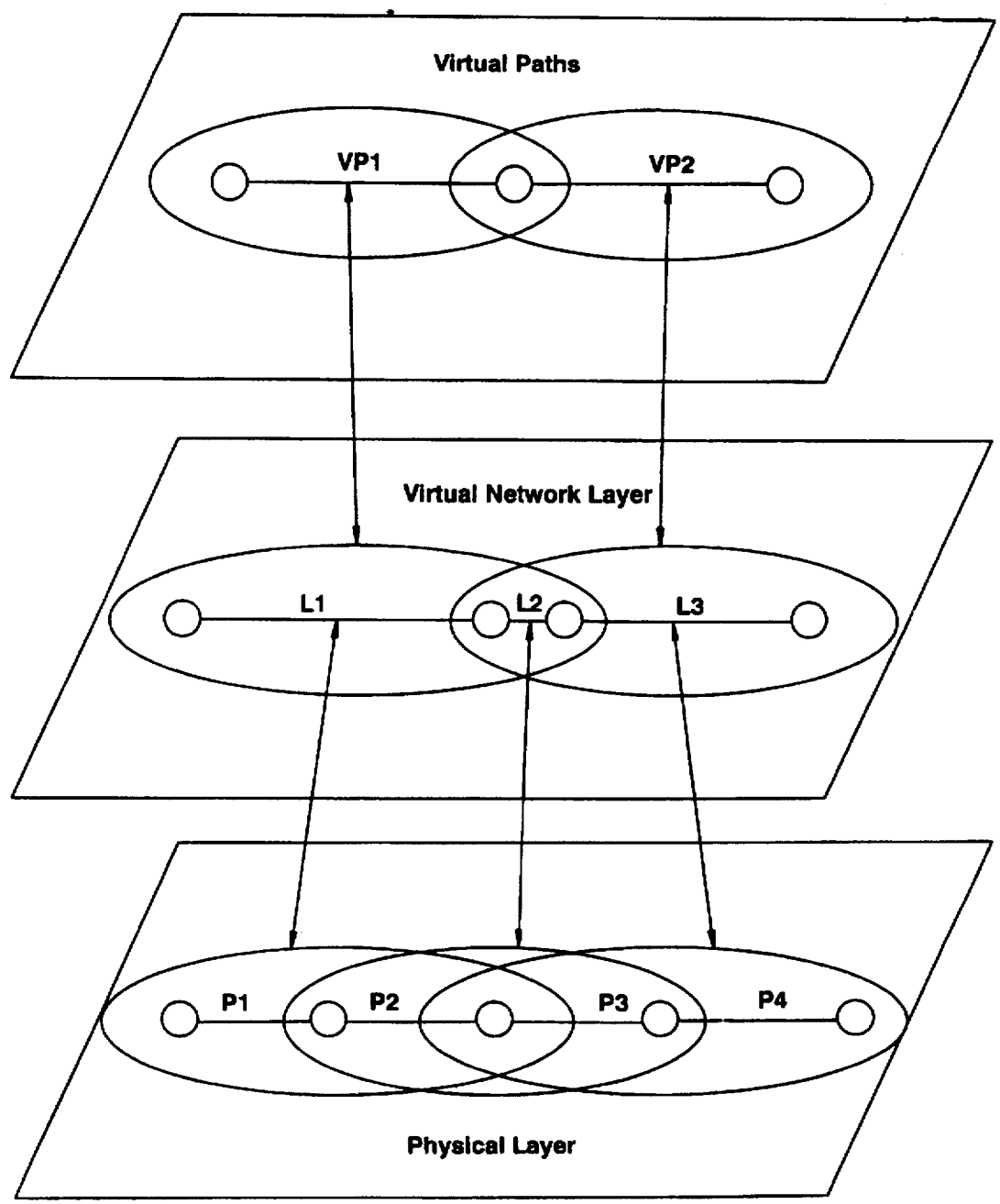
FIG. 18 is a three-layer abstraction model to show the topological relationship between physical paths, virtual links and virtual paths.

In one embodiment of the present invention, a three-layer model has been used to solve the virtual network (VN) dimensioning problem. This three-layer model is shown in FIG. 18. The lowest layer of this three-layer model is the physical layer, on which the physical network topology and the physical link resources have been specified. Usually these specifications constitute the constraints of the VN dimensioning problem. However, the solution technique detailed herein is not limited to situations where the physical network is invariant, but can be adapted to solve the network planning problem also. As referred herein, the network planning problem involves finding the optimal allocations of capacity on the physical links of a network, given an offered traffic pattern.

The middle layer of the three-layer model shown in FIG. 18 is the virtual network layer, on which the topology of one or more virtual networks and virtual links are described. Each virtual network is made up of one or more virtual links. It should be noted that each virtual link on the virtual network layer represents a set of one or more physical links on the physical layer. In the model problem that has been solved here, the various virtual networks are assumed to be distinct.

The top layer of the three-layer model of FIG. 18 is the virtual path layer. Virtual paths defined on the virtual path layer abstractly describe the traffic on the virtual networks of the layer below. It should be noted that the virtual paths on the top layer that correspond to different virtual networks on the layer below are non-overlapping in the exemplary model. However, the model may be extended to cover situations where different virtual networks share the resources of the layer below or where virtual paths corresponding to different virtual networks are aggregated into virtual trunks carrying aggregated traffic.

Generalizing Three-Layer VN Dimensioning Problem To N-Layers

It should be noted that the three-layer abstraction model can be generalized without limit to a N-layer abstraction model, where N is any positive integer. In the N-layer case, the technique described herein is capable of dimensioning the links on layer N–1 subject to the resource constraints on layer N–2.

To understand the generalization of the VN dimensioning problem from three to N-layers, consider a model situation where an operator maintains an ATM network. This ATM network can be considered as the bottom layer ("infrastructure") of a multi-layered hierarchy. Assume further that the topology and the physical resources of the ATM network layer are fixed and thus constitute the constraints to the entire dimensioning problem.

We can recursively construct one or more "sandwich" layers on top of the ATM network layer. A "sandwich" layer as used herein can be defined as an aggregation of adjacent layers. Each sandwich layer may be considered as a three-layered structure that is identical to the model used for solving the VN dimensioning problem. The layer below the sandwich can be recursively considered as the constraining physical infrastructure in a recursively formulated VN dimensioning problem. This concept can be illustrated for the case involving a single sandwich structure.

Assume that a plurality of leased lines (which may be equivalent to virtual paths or to logical links) are defined on top of the ATM network layer. These can now be considered as constituting a new physical infrastructure for the sandwich that can be considered to be invariant for the time period of existence of the sandwich. These logical links (LL) can then be used as the constraining resources for a virtual network (VN) layer that is built on the top of the LL layer. The VN layer is not the same as the LL layer and is further, variable, i.e., it may be subject to numerous reconfigurations during the life time of the sandwich structure.

These reconfigurations may be necessitated by time-varying user demands. For example, the telecommunication needs of a large corporation, with several geographically-distributed divisions, may vary with time due to the adoption of newer technologies or due to the growth of some divisions or the shrinkage of other divisions. Transport services are defined on the top layer of each sandwich. The network operator assumes the responsibility for reconfiguring the virtual networks. The virtual networks of the sandwich model can represent, for example, interconnected local-area or wide-area networks. On top of each of the virtual networks there can be a layer of VPs that correspond to routes for aggregating traffic streams. These mapped VPs are defined later, in the section of this application detailing the basic three-layer VN dimensioning problem.

It should be noted that the logical link layer is not necessary for analyzing the dimensioning problem. The principal reason for still including such a layer is to isolate the sandwich structure from the ATM network layer. In this manner, the reconfiguration of the virtual networks can be done by the sandwich operator without involvement of the ATM operator. This simplifies the management of the ATM layer since the time duration of the logical links will correspond to the time duration of the sandwich structure.

The VN Dimensioning Problem

The virtual network (VN) dimensioning problem solved herein can be formulated as follows: One starts with a physical network having a specified topology in terms of its component physical links (PLs) and specified physical link capacities. A number of distinct virtual networks that share physical resources are defined on top of this physical network. The topological structure of each virtual network is specified in terms of its component virtual links. The VN topology is related to the PN topology and the VP topology is related to the corresponding VNs. Finally, the offered traffic on the various virtual paths is also given. The goal of the VN dimensioning problem is to allocate capacities to the various VLs and VPs without violating the topological or resource constraints.

Partitioning Schemes

Generally, the purpose of dimensioning is to fractionate the physical infrastructure into partitions, in such a way that there is no interaction (i.e., multiplexing) between different partitions and that there is some interaction (i.e., multiplexing) inside each partition. Multiplexing gains avail whenever an aggregated traffic stream requires less transmission capacity than the sum of the capacities required for each of its component traffic streams.

In the model VN dimensioning problem considered here, the partitioning of resources between different virtual networks is assumed to be complete. Consequently, this dimensioning model does not handle the multiplexing of traffic streams belonging to different virtual networks, even if two or more of the virtual networks share the same physical resources. Sharing of available physical resources among multiple traffic streams is permitted only within a single virtual network.

There are at least three partitioning schemes for the virtual network dimensioning problem that conform to the multiplexing rules of the above model:

a. A virtual path (VP) partitioning scheme wherein each virtual path on each virtual network is partitioned from all other virtual paths such that there is no multiplexing between any two distinct virtual paths.

b. A virtual link (VL) partitioning scheme wherein each virtual link of each virtual network is partitioned from all other virtual links such that there is no multiplexing between distinct virtual links while different VPs traversing the same virtual link are permitted to share resources of the layer below.

c. A physical link (PL) partitioning scheme wherein each virtual network is partitioned from all other virtual networks. Here, there is no multiplexing between different virtual networks, while the virtual links inside a single virtual network are permitted to share resources of the layer below.

From the point of view of network management, the VP partitioning scheme is the least complex. However, it results in a lower utilization of the available physical resources as compared to the other two partitioning schemes. In contrast, the PL partitioning scheme is operationally the most complex, but offers the highest utilization of available physical resources of the three partitioning schemes. Each of these three partitioning schemes is considered in greater detail below.

The VN dimensioning problem is first considered using the VP partitioning scheme. Next, the VN dimensioning problem is considered when virtual links are not permitted to share physical resources. This corresponds to the use of the VL partitioning scheme defined above. Finally, the VN dimensioning problem is directed at situations where distinct virtual links are allowed to share physical resources. This corresponds to using the PL partitioning scheme defined above. As shown below, the VN dimensioning problem can be reduced to an equivalent VP dimensioning problem for all three partitioning schemes.

The equivalent VP dimensioning problem can be solved to obtain resource allocations for the various virtual links using any of the solution techniques detailed earlier. The system and method of the present invention are illustrated by dimensioning a set of virtual networks employing the PL partitioning scheme using an entropy-based VP dimensioning algorithm. The accuracy and speed of the entropy-based dimensioning algorithm are evaluated by comparing its performance to two other known algorithms.

VN Dimensioning Concepts

In order to handle the layered description of the VN dimensioning problem in a uniform and efficient way, we first need to define the model and some notation. The membership relation between the virtual links of a virtual network and the corresponding physical links can be described using a VN-specific structure matrix. The structure matrix is conceptually similar to the routing matrix that was defined earlier in solving the VP dimensioning problem. It should be recalled that the routing matrix described the membership relation between virtual paths defined on top of a base network and the links of the base network.

The hierarchically-decomposed VN dimensioning problem can be reduced to the VP dimensioning problem as shown below. The reduction procedure is similar to the process of compilation. The virtual network structure and the traffic demand defined on top of this structure can be considered as a high-level specification. The VP dimensioning problem can be considered as a low-level specification. The system and method of the present invention procedure "compiles" a high-level specification to a low-level specification. This analogy is emphasized below by referring to the reduced VP structure as the compiled structure. It should be noted that the compilation procedure can be used in conjunction with any VP dimensioning algorithm.

A virtual network (VN) structure matrix describes the topological structure of the virtual links that make up a virtual network. Since each virtual network is a set of virtual links and since the virtual links in any virtual network are abstractions of physical links defined on the underlying physical network, the VN structure matrix describes a set of paths on the physical network.

The VN structure matrix consists of zeros and ones and describes a set of membership relations. The structure matrix has as many rows as there are physical links and as many columns as there are virtual links. Each column of the VN structure matrix defines one such a membership relation and represents a single virtual link. The membership relation is represented as a subset of the plenary set of all physical links. Thus, a value of one in row p of column vector i denotes that virtual link $VL_i$ traverses physical link $PL_p$, while a value of zero denotes that $VL_i$ does not traverse physical link $PL_p$.

Each virtual link is mathematically defined by the physical link elements that constitute the corresponding subset. This subset is a mathematical notion for the virtual link. Each virtual network has its own structure matrix describing all the virtual links that belong to the virtual network. It should be noted that this matrix representation allows each virtual link to be an abstraction of any aggregation of physical links, e.g., a sub-network. A virtual path is merely a special type of sub-network. Hence, the VP dimensioning problem is merely a special case of the VN dimensioning problem.

The quantitative relation between the capacities of various virtual links and the corresponding capacities allocated to physical links can be obtained by defining link capacity vectors for both the virtual network layer as well as the physical network layer. Expressed in matrix notation, the relationship has the following form:

$$S^k C^k = C_{phys}^k \quad \text{(EQN. 33)}$$

where $S^k$ is the structure matrix for virtual network k, $C^k$ is the virtual capacity vector defining the capacities of the virtual links of virtual network k and $C_{phys}{}^k$ is the corresponding vector of physical capacities allocated to the various virtual links of virtual network k.

The cumulative physical capacities allocated to all the virtual networks must not exceed the available capacity of the physical network. This can be expressed by the constraint relation:

$$\sum_{k=1}^{K} (S^k \cdot C^k) \leq \bar{C}_{phys} \qquad \text{(EQN. 34)}$$

where $\bar{C}_{phys}$ is a vector describing available physical capacities and the summation is done over all K virtual networks. Since this is a vector inequality, the corresponding components of each vector must satisfy the inequality individually.

VN Dimensioning Problem Using A VP Partitioning Scheme

When a VP partitioning scheme is used, the VN dimensioning problem becomes the determination of the capacity allocations for the virtual paths and the virtual links that maximally utilize physical network resources without violating physical capacity constraints.

The VP partitioning scheme for the VN dimensioning problem has the same structure as the standard VP dimensioning problem. Since the virtual link capacities on each of the virtual networks is not known in advance, a VP dimensioning problem specified on the VN layer needs to be mapped to a refined VP dimensioning problem that is specified on the physical network layer.

This can be accomplished by using a structure matrix, $S^k$, relating the structure of each virtual network to the structure of the physical network below, and a routing matrix, $\chi^k$, describing the VPs on each virtual network in terms of the virtual links. It should be noted that the virtual links can be considered as paths on the physical network, just as virtual paths are considered as paths on the virtual network. This recursive definition can be extended to N-layer network dimensioning models.

Since the routing matrix, $\chi^k$, maps the virtual paths to the virtual links and the VN structure matrix, $S^k$, maps the virtual links to physical links, it is clear that there exists some superposition of the two matrices $S^k$ and $\chi^k$ that will define the virtual paths directly in terms of physical links. The desired superposition is the Bool product of the two matrices, denoted as:

$$\Gamma^k = S^k \otimes \chi^k \qquad \text{(EQN. 35)}$$

Given two matrices, M and N, of conforming sizes, such that ordinary matrix multiplication is feasible, and all of whose elements are zeros or ones, the Bool product of the two matrices is denoted by M⊛N, and defined as the rescaled ordinary matrix multiplication product of matrices M and N where each of the non-zero elements in the resulting matrix is rescaled to one.

The combined structure matrix, $\Gamma^k$, also called the collapsed structure matrix, can be considered as specifying the projection of the fixed routing on each virtual network to the physical layer. By this procedure, the VP dimensioning problem for a particular virtual network on the VN layer can be mapped to a refined VP dimensioning problem on the physical network layer.

Since all virtual networks on the virtual network layer compete for resources allocated on the same physical network, all collapsed structure matrices, $\Gamma^k$, must be aggregated to one structure matrix:

$$\Gamma_{phys} = \underset{k=1, K}{concat} (\Gamma^k) \qquad \text{(EQN. 36)}$$

The concat operation denotes that the matrix $\Gamma_{phys}$ is an aggregation of all the collapsed structure matrices, $\Gamma^k$. This matrix can be called the compiled structure matrix. Physically, the concatenation of matrices yields a new matrix consisting of all columns of the concatenated matrices. While the order of this concatenation is not significant to the dimensioning procedure, it is still important to retain information about the concatenation order for computational accuracy.

The above definition of the compiled structure matrix, $\Gamma_{phys}$, can be understood as describing the set of all mapped paths defined on the physical network layer while each of the collapsed structure matrices $\Gamma^k$ describe only a subset of such mapped paths. The mapped paths of the compiled VN dimensioning problem are analogous to the virtual paths of the basic VP dimensioning problem. All the subsets of the mapped paths need to be aggregated to obtain the plenary set of all mapped paths, exactly as obtained in the compiled structure matrix, $\Gamma_{phys}$.

Since $\Gamma_{phys}$ has been defined, any VP dimensioning algorithm can now be applied to dimension the aggregated VPs and determine the capacities allocated to each of the VPs defined by the $\Gamma_{phys}$. Using the routing matrix $\chi^k$, the corresponding virtual link capacities $C^k$ allocated on each of the K virtual networks, can be calculated as:

$$C^k = \chi^k \cdot V^k \qquad \text{(EQN. 37)}$$

where $V^k$ denotes the vector of the capacities allocated to the paths defined on virtual network k. Equation (EQN. 37) describes the output of the VN dimensioning algorithm.

The Compilation Procedure

A three-layered model is shown in FIG. 18, where a virtual network is defined on top of a physical network and virtual paths are defined on top of the virtual network. The routing matrix that relates the VN layer with the VP layer was defined in Equation (EQN. 1) and accompanying text. For a VN layer with three links, $L_1$, $L_2$ and $L_3$, the VN structure matrix has the following form:

$$S = \begin{bmatrix} 1 & 0 & 0 \\ 1 & 1 & 0 \\ 0 & 1 & 1 \\ 0 & 0 & 1 \end{bmatrix} \qquad \text{(EQN. 38)}$$

For the example of FIG. 18, the compiled structure matrix, $\Gamma$ that defines virtual paths directly in terms of the physical network and the collapsed structure matrix that relates virtual links to physical links are both identical because there is only one VN in this example.

$$\begin{bmatrix} 1 & 0 & 0 \\ 1 & 1 & 0 \\ 0 & 1 & 1 \\ 0 & 0 & 1 \end{bmatrix} \otimes \begin{bmatrix} 1 & 0 \\ 1 & 1 \\ 0 & 1 \end{bmatrix} = \begin{bmatrix} 1 & 0 \\ 1 & 1 \\ 1 & 1 \\ 0 & 1 \end{bmatrix} = \Gamma \qquad \text{(EQN. 39)}$$

Equation (EQN. 39) can be interpreted as denoting that the virtual network layer consists of three virtual links $L_1$, $L_2$ and $L_3$, each of which is an aggregation of two physical links. If virtual link $VL_j$ traverses physical link $P_p$, this is indicated by a one in row p and column j of the VN structure matrix, S. Each of the virtual paths $VP_1$ and $VP_2$ are aggregations of three of the four physical links, $P_1$, $P_2$, $P_3$ and $P_4$. If virtual path $VP_i$ traverses physical link $P_p$, this is indicated by a one in row p and column i of the compiled structure matrix, $\Gamma$.

Figure 19:
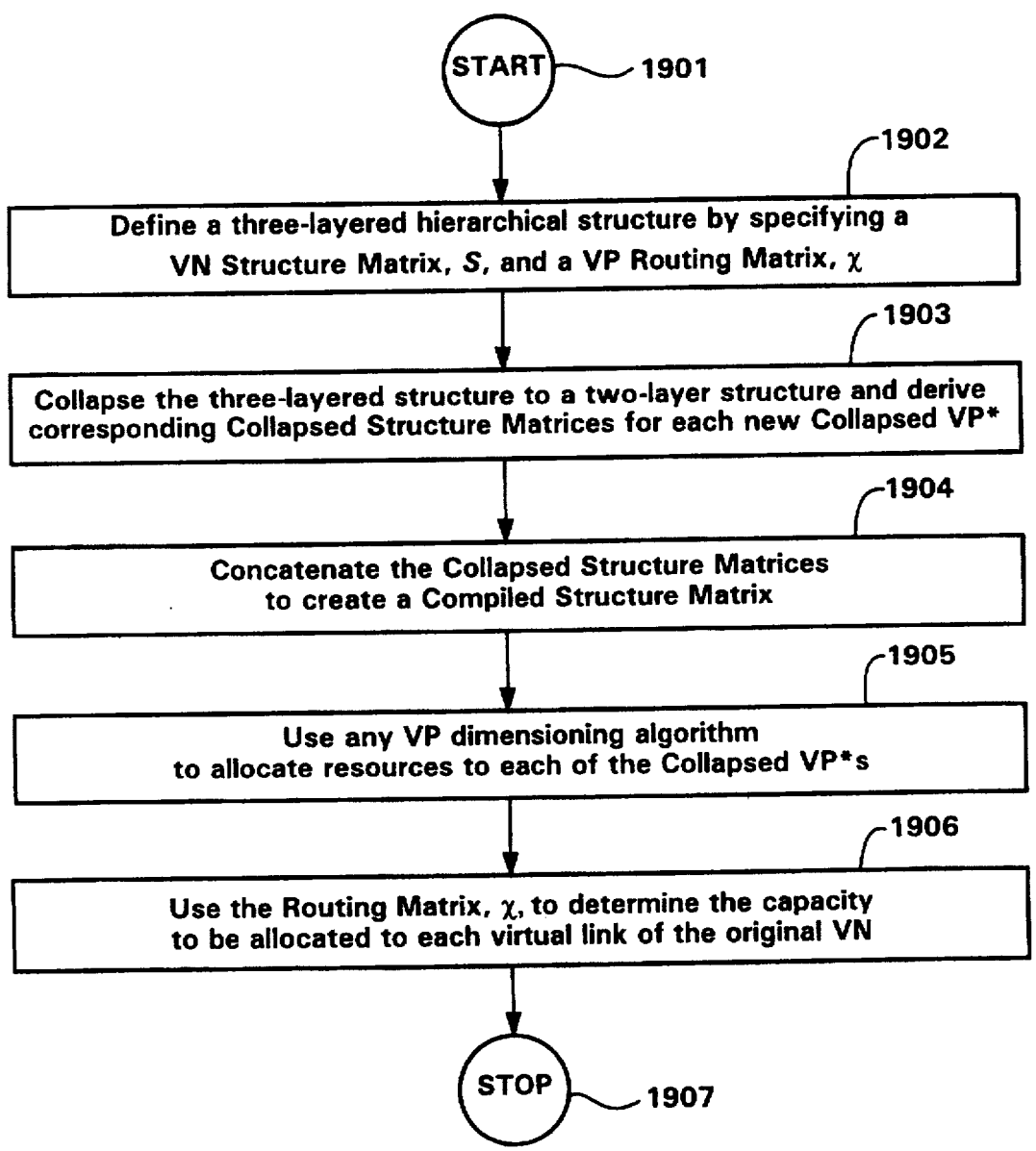
FIG. 19 is a flow chart illustrating the compilation procedure for transforming the virtual network dimensioning problem into an equivalent virtual path dimensioning problem.

The compilation procedure for the VP partitioning scheme is outlined in FIG. 19. A three-layer hierarchical structure is first defined at 1902 by selecting the top three layers of a N-layer VN dimensioning problem. The lowest layer corresponds describes the physical network topology and constraints, the middle layer describes the virtual networks that are to be dimensioned and the top layer describes the routing structures (i.e., the VPs) that are defined on top of each of the virtual networks. At the same time, the corresponding VN structure matrix and the VP routing matrices are also constructed at 1902. The three-layer problem formulation is then collapsed to a corresponding two-layer problem at 1903. Since every route on the initial top layer (i.e., VP) of every virtual network utilizes some physical capacity of the physical network, a corresponding collapsed routing matrix can be derived that describes the physical resources allocated to each mapped route in the collapsed structure.

The collapsed structure matrices for the various mapped routes are next concatenated at 1904 to a single compiled structure matrix that describes the topology of each mapped VP in terms of the various physical links. Any VP dimensioning algorithm can then be applied at 1905 to the compiled description of the VN dimensioning problem to determine the transmission capacity to be allocated to each collapsed VP. Examples of such VP dimensioning algorithms include, without limitation, the Push Down algorithm depicted in FIG. 9, the basic entropy-based VP dimensioning algorithm shown in FIG. 12 and the adaptive VP dimensioning algorithm illustrated in FIG. 13. Finally, the VP routing matrix is used at 1906 to calculate the value of the capacity to be allocated to each virtual link of each virtual network.

Overview Of VL and PL Partitioning Schemes

In general, different virtual links can interact with each other, i.e., they may share the same physical resources. This permits the multiplexing of traffic allocated to these links. In the case where virtual links do not interact with each other, the aggregated traffic streams must be defined for each logical link. If, on the other hand, virtual links are permitted to interact with each other, then the aggregated traffic streams need to be defined for each physical link. Where multiplexing between virtual links is not permitted, a virtual network will behave like a leased physical network. The management of such a network is easier although such networks have lower utilization rates for resources allocated to them as compared to networks permitting multiplexing between virtual links.

VL Partitioning Scheme

Non-interacting virtual links can be considered as VPs on top of the physical layer. The dimensioning task here is to determine the aggregated offered traffic that is to be allocated to each virtual link. This can be obtained from the routing matrix, since the offered traffic is specified on virtual paths on the top of each virtual network. The next step is to obtain the global set of all virtual links and determine their relation to the set of all physical links. This global set is an aggregation of the virtual links of each virtual network.

It should be noted that the structure of the virtual network affects only the offered aggregated traffic, and has no bearing on the task of dimensioning the virtual link capacities. From the point of view of the physical layer, each virtual link constitutes a virtual path and thus the VN dimensioning problem using the VL partitioning scheme also reduces to a VP dimensioning problem, thus permitting the use of any of the VP dimensioning algorithms detailed earlier.

The offered traffic on the R mapped routes, $X_r$, can be assembled into a route traffic vector, X. Likewise, the offered traffic on the J virtual links, $U_j$, can be assembled into a link traffic vector, U. The route traffic vector and the link traffic vector can be related using the routing matrix, $\chi$, as:

$$U_j = \sum_{r=1}^{R} (X_{j,r} X_r) \qquad \text{(EQN. 40)}$$

In vector notation, Equation (EQN. 40) becomes:

$$U = \chi \cdot X \qquad \text{(EQN. 41)}$$

Let $d_j$ be the capacity allocated to virtual link j and $b_r$ be the corresponding allocated capacity on path (route) r. It follows that:

$$d_j = \sum_{r=1}^{R} (X_{j,r} b_r) \qquad \text{(EQN. 42)}$$

In vector notation, Equation (EQN. 42) becomes:

$$d = \chi \cdot b \qquad \text{(EQN. 43)}$$

The entropy blocking measure, $I_{U_j}(d_j)$, for the virtual link capacity, $d_j$, is governed by the equation:

$$I_{U_j}(d_j) = \sup_{q_j} (q_j d_j - \ln E(e^{q_j U_j})) \qquad \text{(EQN. 44)}$$

Given offered traffic, $U_j$, the entropy blocking measure, $I_{U_j}(d_j)$, on virtual link j can be calculated. Thus, given a set of all virtual links defined as virtual paths on the physical network, the VN dimensioning problem using the VL partitioning scheme can also be solved by mapping the problem to a VP dimensioning problem.

Comparison of VP and VL Partitioning Schemes

If we define an allocated link resources vector, d, to correspond to the allocated route resources vector, b, then $d_{VL} < d_{VP}$ where $d_{VP}$ denotes the allocated link resources vector for the VP partitioning scheme and $d_{VL}$ denotes allocated resources vector for the VL partitioning scheme. This inequality reflects the gains obtained by multiplexing aggregated offered traffic on each virtual link.

PL Partitioning Scheme

Consider next, the case where different virtual links belonging to the same virtual network are permitted to be multiplexed. The corresponding aggregated offered traffic now needs to be determined for each physical partition and also for the set of all partitions. This can be done by using the routing matrix, $\chi$, and virtual network structure matrix, S. The aggregated offered traffic for each physical partition is defined as the aggregate of the aggregated virtual link traffic. This additional aggregation can be obtained by using the VN structure matrix since it defines the membership relationship between the various virtual links and the corresponding physical network. If the aggregated offered traffic on each of the J physical links is denoted by the vector Z, and the equivalent capacity allocated to each of the J physical links is denoted by the vector g, then by using the notation previously developed, we obtain the expression:

$$Z_i = \sum_{j=1}^{J} (S_{i,j} U_j) \qquad \text{(EQN. 45)}$$

Expressed in corresponding vector notation, this becomes:

$$Z = S \cdot U = S \cdot \chi X \qquad \text{(EQN. 46)}$$

where the compound matrix $S \cdot \chi$ relates the VP offered traffic vector, X to the aggregated PL offered traffic, Z. The corresponding expression for the Entropy Rate Function is given by:

$$I_{Z_i}(g_i) = \sup_{q_i} (q_i g_i - \ln E(e^{q_i Z_i})) \quad \text{(EQN. 47)}$$

The membership matrix defining the physical partition is determined, as previously discussed, using the collapsed structure matrix, $\Gamma^k$, that was defined in Equation (EQN. 35) as the Bool product, $S^k \otimes \chi^k$. Thus, a VN dimensioning problem that uses the PL partitioning scheme is again shown to be reducible to the VP dimensioning problem.

Comparison of VL and PL Partitioning Schemes

It is illustrative to compare the VL and the PL partitioning schemes in order to understand the differences between these two approaches and to show the effects of multiplexing aggregated traffic on the resulting capacity allocations. Consider the network structure shown in FIG. 20 and tabulated in TABLE 13:

TABLE 13

| Virtual Link | Route |
|---|---|
| 2-5 | 2-1-6-5 |
| 3-6 | 3-4-5-6 |
| 5-6 | 5-6 |
| 3-5 | 3-5 |
| 2-6 | 2-6 |
| 2-3 | 2-3 |

Assume that the multi-class traffic having the characteristics shown in TABLE 14 is offered to all virtual links.

TABLE 14

| Effective Bandwidth [Mbit/s] | Call Arrival Rate [1/s] | Holding Time [s] |
|---|---|---|
| 1 | 0.25 | 30 |
| 1 | 0.01 | 240 |
| 1 | 0.051 | 90 |

The capacity of each physical link is assumed to be 150 megabits per second.

Results For PL Partitioning Scheme

If we use a PL partitioning scheme, there are eight physical partitions of the VN dimensioning problem that correspond to the eight physical links 2001 to 2008 shown in FIG. 20 and listed in the first column of TABLE 15 below. The aggregated offered traffic on each partition can be derived from the offered traffic on the various virtual links. For example, the aggregated traffic offered to the partition on physical link $P_{5-6}$ is 43.47 units. This value is calculated as three times the scalar product of the call arrival rate vector and the holding time vector listed in TABLE 14, i.e., $3*(0.25*30+0.01*240+0.051*90)$. The aggregated offered traffic is three times the scalar product of the two vectors because there are three virtual links traversing this partition. This exemplary VN dimensioning problem employing a PL partitioning scheme has been solved using an entropy-based VP dimensioning algorithm and the results are shown in TABLE 15 below.

TABLE 15

| Partitioned Physical Link | Capacity Allocated To Partition |
|---|---|
| 2-3 | 23.0 |
| 3-4 | 32.3 |

TABLE 15-continued

| Partitioned Physical Link | Capacity Allocated To Partition |
|---|---|
| 4-5 | 53.2 |
| 5-6 | 48.7 |
| 2-6 | 37.5 |
| 3-5 | 37.5 |
| 6-1 | 53.2 |
| 2-1 | 53.2 |

Results For VL Partitioning Scheme

If a VL partitioning scheme is used on the VN dimensioning problem, the traffic offered to each virtual link is the same as before, i.e., 14.49 units $(0.25*30+0.01*240+0.051*90)$. When virtual links are treated as partitions, the capacities allocated to different virtual links are as listed in TABLE 16 below.

TABLE 16

| Virtual Link | Allocated Capacity |
|---|---|
| 2-5 | 16.7 |
| 3-6 | 16.7 |
| 2-3 | 21.4 |
| 2-6 | 69.1 |
| 3-5 | 69.1 |
| 6-5 | 16.7 |

Figure 20:
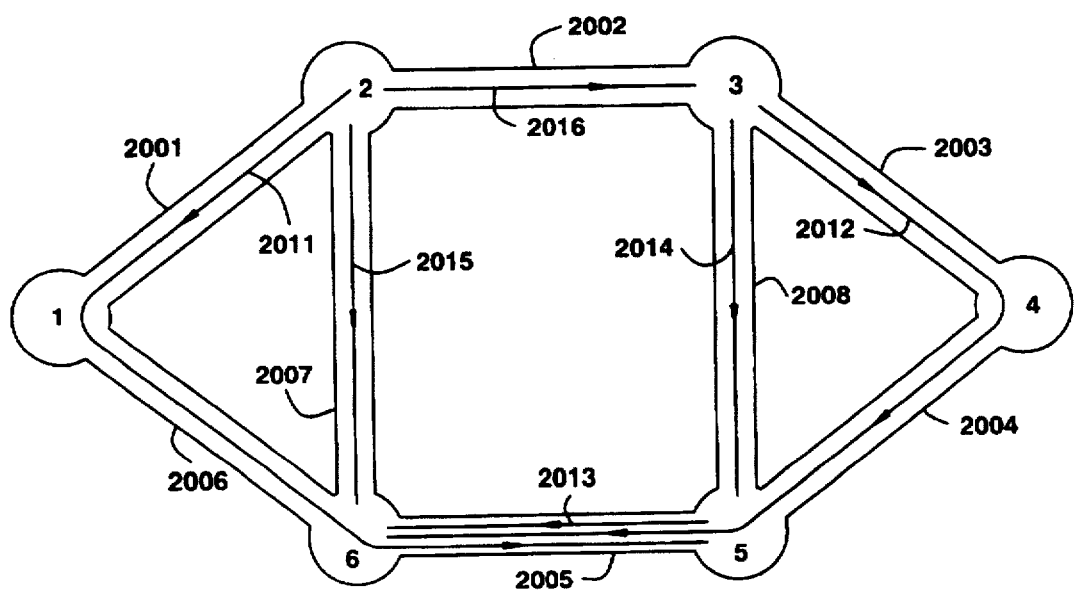
FIG. 20 is a diagram showing an exemplary virtual network having six links that is superposed on the six-node network of FIG. 16.

It should be noted that the routing structure of the virtual network remains as shown in FIG. 20 and TABLE 13.

Now the effect of multiplexing can be studied. Consider for example physical link $P_{5-6}$. The total capacity allocated to the three virtual links that use this physical link is 48.7 units in the case of the PL partitioning scheme, which is smaller than 50.1 units, the sum of the individual allocated capacities in the VL partitioning scheme, (i.e., $16.7+16.7+16.7$).

Comparison With Prior VN Dimensioning Algorithms

The performance of the VN dimensioning techniques detailed in this algorithms have been compared to other algorithms. The results presented below involve a VN dimensioning problem that employs a PL partitioning scheme (sometimes called the complete partitioning scheme).

Consider the five virtual networks 2101 to 2105 shown in FIG. 21. The topology of the underlying physical network is the same as described in the text accompanying FIGS. 16 and 17. The five virtual sub-networks with topologies as shown in FIG. 21 are assumed to the share resources of a single physical network shown in FIGS. 16 and 17.

Virtual network 2103 shown in FIG. 21 represents an example where multiplexing between virtual links is possible. The physical link $P_{5-6}$ is traversed by three virtual links: $L_{3-6}$, which runs from Node 3 to Node 6 via Nodes 4 and 5, $L_{2-4}$, which runs from Node 2 to Node 4 via Nodes 5 and 4, and $L_{5-6}$. In the case of the PL partitioning scheme, the offered traffic from these three virtual links can be aggregated to one traffic stream on the physical link $P_{5-6}$. Correspondingly, the dimensioning algorithm also allocates capacity to physical link $P_{5-6}$.

In this example, all physical links are assumed to have the same capacity of 2400 units. A multi-class Poissonian traffic can be offered to these five virtual sub-networks. In the model problem analyzed herein, four classes of traffic demand are defined for each virtual link and each virtual subnetwork having the characteristics shown below. The traffic demand, $\rho_i$, for class i (where i takes integer values between 1 and 4) is assumed to be functionally governed by the relation:

$$\rho_i = \frac{1}{\beta^i} \frac{14000\,\alpha^i}{\sum_{i=1}^{I} \alpha^i} \quad \text{(EQN. 48)}$$

for the 3-node virtual sub-networks, and $$\rho_i = \frac{1}{\beta^i} \frac{7000\,\alpha^i}{\sum_{i=1}^{I} \alpha^i} \quad \text{(EQN. 49)}$$

for the 4-node sub-networks. Simultaneously, the bandwidth demand, $p_i$, for traffic class i is taken to be:

$$p_i = 0.064 \beta^i \quad \text{(EQN. 50)}$$

where the parameter, $\beta$, defines the heterogeneity of the offered traffic, i.e., the difference between bandwidth demands of differing classes, given that each class can itself carry multiple rates of traffic. A unit value of $\beta$ represents homogeneous traffic. The parameter $\alpha$ defines the distribution of the traffic demand among the four traffic classes.

Two other dimensioning methods have been compared to the method set forth below. These other methods represent two extreme approaches, one of them slow but based on a well-elaborated theoretical framework and the other fast but based on rough theoretical simplifications.

The first of these benchmark dimensioning algorithms used the Fixpoint algorithm as detailed in A. Farago, S. Blaabjerg, W. Holender, T. Henk, L. Ast, A. Szentesi & Z. Ziaga, "Resource Separation: An Efficient Tool For Optimizing ATM Network Configurations", NETWORKS94 International Network Planning Symposium Proceedings 83–88 (Budapest, 1994) and S.-P. Chung & K. W. Ross, "Reduced Load Approximations For Multirate Loss Networks", 41 IEEE/ACM Transactions on Communications 1222–31 (1993). This algorithm represents an established method for dimensioning virtual networks. However, this algorithm is not very fast and hence it is used principally to evaluate the accuracy of the results obtained using the new VN dimensioning technique described in this application. The theoretical framework for this benchmark algorithm is well-developed. However, this framework embodies the twin assumptions of link-independence and reduced-load which oversimplify the dimensioning problem.

The second benchmark dimensioning method used the equivalent link blocking (ELB) algorithm as detailed in A. Farago, "A Simplified Dimensioning Model Based On Equivalent Link Blocking Probabilities", Department of Telecommunications and Telematics, Technical University of Budapest (1993). This algorithm represents a rough and ready method of dimensioning virtual networks that is based on substantial theoretical assumptions about the problem. This algorithm is principally used to evaluate the computational speed (i.e., running times) of the new VN dimensioning technique.

Three different evaluation parameters have been used to compare these methods: network revenue, maximum route blocking and running time. Since neither the network revenue nor the maximum route blocking (as a time congestion measure) were generated by the new VN dimensioning technique, additional computations were necessary to obtain these parameters.

The allocated capacities obtained using the VN dimensioning technique of the present application were used as inputs to the benchmark dimensioning techniques. In this way the noncomputed parameters can be calculated as a time congestion blocking measure and revenue function using the same parametric relations as those used in the benchmark algorithms. As detailed earlier in the application, other network operating parameters may be obtained from the Entropy Rate Function.

The revenue function and the blocking parameters for sixteen instances of the offered traffic have been determined for each of the three VN dimensioning algorithms.

The entropy-based VN dimensioning algorithm has been found to be about two order of magnitude faster than the Fixpoint benchmark algorithm method, and about one order of magnitude faster than the ELB benchmark algorithm.

CONCLUSIONS

Two interrelated problems have been addressed and solved in the system and method of the present invention: the VP dimensioning problem and the VN dimensioning problem. In the solution techniques detailed herein, the Entropy Rate Function has been used as a blocking measure and load balancing has been used as a dimensioning technique. The feasibility of this approach has been demonstrated using a number of examples and by comparison to two benchmark algorithms. This new dimensioning method is up two orders of magnitude faster than the prior dimensioning techniques. This considerably faster computational speed has come about at the cost of computational accuracy. Thus, this new method provides better results than hitherto-fore possible. This method is also globally optimal. It is based on the end-to-end blocking measure, and does not require the link-independence or the reduced-load assumptions of prior techniques. The method presented has practical importance for the dimensioning of ATM networks, since it does not assume any particular traffic distribution, and can be used with general traffic.

In the future, ATM networks are likely to be dimensioned based upon actual traffic measurements. The dimensioning system and method detailed herein provides a practical framework for the implementation of dimensioning algorithms that can handle both general offered traffic as well as offered traffic that is determined by measurements.

Although a preferred embodiment of the method and apparatus of the present invention has been illustrated in the accompanying drawings and described in the foregoing detailed description, it is to be understood that the invention is not limited to the embodiment disclosed, but is capable of numerous rearrangements, modifications and substitutions without departing from the spirit of the invention as set forth and defined by the following claims.

What is claimed is:

1. A method for dimensioning a set of one or more virtual networks that are defined on a telecommunications network carrying general traffic, said telecommunications network comprising a plurality of interconnected physical links whose transmission capacities are limited, each of said virtual networks comprising a set of interconnected virtual links, said dimensioning method comprising the steps of:

defining a multi-layer hierarchy having at least three layers to model available resources and demands on said telecommunications network, said multi-layer hierarchy comprising a first layer, a second layer and a third layer, wherein said first layer comprises logical links that represent the physical network, said second layer comprises virtual links that represent a set of one or more virtual networks and said third layer comprises virtual paths that represent a plurality of virtual paths, and further wherein each of said virtual networks on said second layer is related to a select plurality of physical links on said first layer and each of said virtual paths on said third layer is related to said set of virtual networks on said second layer;

selecting a partitioning scheme to define the scope of resource sharing amongst said set of one or more virtual networks;

transforming the dimensioning of said set of virtual networks to an equivalent task of dimensioning a set of modified virtual paths by collapsing said second and third layers of said multi-layer hierarchy to a new layer comprising a plurality of collapsed virtual paths;

allocating capacities to said collapsed virtual paths subject to said transmission capacity constraints of said plurality of logical links using a virtual path dimensioning algorithm; and determining the capacities to be allocated to each virtual link of each virtual network based upon the known relationship between the collapsed virtual paths and said logical links.

2. The virtual network dimensioning method of claim 1 wherein said partitioning scheme used to define the scope of resource sharing is a virtual path partitioning scheme.

3. The virtual network dimensioning method of claim 1 wherein said partitioning scheme used to define the scope of resource sharing is a virtual link partitioning scheme.

4. The virtual network dimensioning method of claim 1 wherein said partitioning scheme used to define the scope of resource sharing is a physical link partitioning scheme.

5. The virtual network dimensioning method of claim 1 wherein the step of allocating capacities to the various collapsed virtual paths is performed by an algorithm comprising the following steps:

choosing an appropriate entropy rate function to model the offered traffic on each collapsed virtual path of said telecommunications network wherein said entropy rate function, $I_x(C)$, is calculable as an approximation of the negative logarithm of the probability that an arbitrarily distributed random variable, X, is greater than or equal to a preselected value, C, said entropy rate function additionally being a convex function that reaches its minimum value of zero at the mean of the distribution;

selecting a solution algorithm using the entropy rate function as a blocking measure that is operative to solve a load balancing problem for said general traffic; and performing computations on a computing system using said load balancing algorithm incorporating said entropy rate function to produce a load distribution on said collapsed virtual paths that is as uniform as possible.

6. The virtual network dimensioning method of claim 5, wherein said entropy rate function is determined by traffic measurements.

7. The virtual network dimensioning method of claim 5 wherein said entropy rate function is determined by idealizing the characteristics of offered traffic on a telecommunications network.

8. The virtual network dimensioning method of claim 7 wherein said entropy rate function is idealized for a homogenous Poissonian distribution of offered traffic.

9. The virtual network dimensioning method of claim 7 wherein said entropy rate function is idealized for a multi-class Poissonian distribution of offered traffic.

10. The virtual network dimensioning method of claim 7 wherein said entropy rate function is idealized for a Normal distribution of offered traffic.

11. The virtual network path dimensioning method of claim 7 wherein said entropy rate function is idealized for a Binomial distribution of offered traffic.

12. The virtual network dimensioning method of claim 1 wherein said virtual path dimensioning algorithm for allocating capacities to said collapsed virtual paths subject to said transmission capacity constraints of said plurality of logical links comprises the following steps:

mapping said plurality of logical links into one or more virtual paths, each of said virtual paths providing an individually switchable connection between a pair of nodes in the telecommunications network;

specifying the transmission capacity of each logical link;

assembling a selected plurality of said virtual paths into a dimensioning set;

allocating initial values of transmission capacity to each virtual path in said dimensioning set using the entropy rate function as a blocking measure, each of said initial values being equal and chosen so that the blocking is large;

recursively identifying as critical links those logical links whose capacities are fully allocated amongst the virtual paths traversing them, by the following sub steps:

calculating the capacity to be allocated to each virtual path using the previous entropy rate function estimate and the previously calculated shift parameter value;

summing the capacities allocated to all of said virtual paths for each logical link to obtain the total allocated capacity on each physical link;

incrementing the entropy rate function estimate by a calculated amount;

recalculating the shift parameter for each virtual path in said dimensioning set; and comparing said total allocated capacity of each logical link to its specified capacity to determine if the unallocated capacity said logical link is substantially zero;

outputting the currently allocated capacities on each of the virtual paths traversing a logical link identified as a critical link;

removing all virtual paths traversing each critical logical link from said dimensioning set; and redefining the specified physical capacities of said logical links to compensate for the capacities allocated to said removed virtual paths.

13. A system for dimensioning a set of one or more virtual networks that are defined on a telecommunications network carrying general traffic, said telecommunications network comprising a plurality of interconnected physical links whose transmission capacities are limited, each of said virtual networks comprising a set of interconnected virtual links, said system comprising:

means for defining a multi-layer hierarchy having at least three layers to model available resources and demands on said telecommunications network, said multi-layer hierarchy comprising a first layer, a second layer and a third layer, wherein said first layer comprises logical links that represent the physical network, said second layer comprises virtual links that represent a set of one or more virtual networks and said third layer comprises virtual paths that represent a plurality of virtual paths, and further wherein each of said virtual networks on said second layer is related to a select plurality of physical links on said first layer and each of said virtual paths on said third layer is related to said set of virtual networks on said second layer;

means for selecting a partitioning scheme to define the scope of resource sharing amongst said set of one or more virtual networks;

means for transforming the dimensioning of said set of virtual networks to an equivalent task of dimensioning a set of modified virtual paths by collapsing said second and third layers of said multi-layer hierarchy to a new layer comprising a plurality of collapsed virtual paths;

means for allocating capacities to said collapsed virtual paths subject to said transmission capacity constraints of said plurality of logical links using a virtual path dimensioning algorithm; and means for determining the capacities to be allocated to each virtual link of each virtual network based upon the known relationship between the collapsed virtual paths and said logical links.

14. The virtual network dimensioning system of claim 13 wherein said partitioning scheme used to define the scope of resource sharing is a virtual path partitioning scheme.

15. The virtual network dimensioning system of claim 13 wherein said partitioning scheme used to define the scope of resource sharing is a virtual link partitioning scheme.

16. The virtual network dimensioning system of claim 13 wherein said partitioning scheme used to define the scope of resource sharing is a physical link partitioning scheme.

17. The virtual network dimensioning system of claim 13 wherein the means for allocating capacities to the various collapsed virtual paths includes:

means for choosing an appropriate entropy rate function to model the offered traffic on each collapsed virtual path of said telecommunications network wherein said entropy rate function, $I_x(C)$, is calculable as an approximation of the negative logarithm of the probability that an arbitrarily distributed random variable, X, is greater than or equal to a preselected value, C, said entropy rate function additionally being a convex function that reaches its minimum value of zero at the mean of the distribution;

means for selecting a solution algorithm using the entropy rate function as a blocking measure that is operative to solve a load balancing problem for said general traffic; and means for performing computations on a computing system using said load balancing algorithm incorporating said entropy rate function to produce a load distribution on said collapsed virtual paths that is as uniform as possible.

18. The virtual network dimensioning system of claim 17, wherein said entropy rate function is determined by traffic measurements.

19. The virtual network dimensioning system of claim 17 wherein said entropy rate function is determined by idealizing the characteristics of offered traffic on a telecommunications network.

20. The virtual network dimensioning system of claim 19 wherein said entropy rate function is idealized for a homogenous Poissonian distribution of offered traffic.

21. The virtual network dimensioning system of claim 19 wherein said entropy rate function is idealized for a multi-class Poissonian distribution of offered traffic.

22. The virtual network dimensioning system of claim 19 wherein said entropy rate function is idealized for a Normal distribution of offered traffic.

23. The virtual network path dimensioning system of claim 19 wherein said entropy rate function is idealized for a Binomial distribution of offered traffic.

24. The virtual network dimensioning system of claim 13 wherein said virtual path dimensioning algorithm for allocating capacities to said collapsed virtual paths subject to said transmission capacity constraints of said plurality of logical links comprises the following:

means for mapping said plurality of logical links into one or more virtual paths, each of said virtual paths providing an individually switchable connection between a pair of nodes in the telecommunications network;

means for specifying the transmission capacity of each logical link;

means for assembling a selected plurality of said virtual paths into a dimensioning set;

means for allocating initial values of transmission capacity to each virtual path in said dimensioning set using the entropy rate function as a blocking measure, each of said initial values being equal and chosen so that the blocking is large;

means for recursively identifying as critical links those logical links whose capacities are fully allocated amongst the virtual paths traversing them, by the following sub steps:

means for calculating the capacity to be allocated to each virtual path using the previous entropy rate function estimate and the previously calculated shift parameter value;

means for summing the capacities allocated to all of said virtual paths for each logical link to obtain the total allocated capacity on each physical link;

means for incrementing the entropy rate function estimate by a calculated amount;

means for recalculating the shift parameter for each virtual path in said dimensioning set; and means for comparing said total allocated capacity of each logical link to its specified capacity to determine if the unallocated capacity said logical link is substantially zero;

means for outputting the currently allocated capacities on each of the virtual paths traversing a logical link identified as a critical link;

means for removing all virtual paths traversing each critical logical link from said dimensioning set; and means for redefining the specified physical capacities of said logical links to compensate for the capacities allocated to said removed virtual paths.

25. The virtual network dimensioning method of claim 1 wherein said step of transforming the dimensioning of said set of virtual networks to an equivalent task of dimensioning a set of modified virtual paths by collapsing said second and third layers of said multi-layer hierarchy to a new layer comprising a plurality of collapsed virtual paths further comprises the following sub-steps:

deriving collapsed structure matrices for each of said collapsed virtual paths; and concatenating said collapsed structure matrices into a compiled structure matrix.

26. The virtual network dimensioning method of claim 25 wherein said collapsed structure matrix, $\Gamma^k$, for the $k^{th}$ collapsed virtual path is the Bool product of the Structure Matrix, $S^k$, and the Routing Matrix, $\chi^k$, said Bool Product being represented in mathematical notation by the equation:

$$\Gamma^k = S^k \otimes \chi^k.$$

27. The virtual network dimensioning method of claim 25 wherein said compiled structure matrix, $\Gamma_{phys}$, is obtained by concatenating its component collapsed structure matrices, $\Gamma^k$, using the relation:

$$\Gamma_{phys} = \underset{k=1,K}{concat} (\Gamma^k).$$

28. The virtual network dimensioning method of claim 1 wherein said virtual path dimensioning algorithm for allocating capacities to said collapsed virtual paths subject to said transmission capacity constraints of said plurality of logical links is a pushdown algorithm (FIG. 9).

29. The virtual network dimensioning method of claim 1 wherein said virtual path dimensioning algorithm for allocating capacities to said collapsed virtual paths subject to said transmission capacity constraints of said plurality of logical links comprises the following sub-steps:

choosing an appropriate entropy rate function to model the load on each virtual path of said telecommunications network;

selecting an adaptive solution algorithm using the entropy rate function as a blocking measure that is operative to solve a load balancing problem for said general traffic; and performing computations on a computing system using said load balancing algorithm incorporating said entropy rate function to produce a load distribution on said virtual paths that is as uniform as possible.

30. The virtual network dimensioning method of claim 1 wherein said virtual path dimensioning algorithm for allocating capacities to said collapsed virtual paths uses the following linear approximation for $\Delta s_i$ while calculating the revised shift parameter estimate:

$$\Delta s_i^t = \frac{\Delta I_k^t}{s_i^t V_i^t(s)}$$

where $\Delta I_k^t$ is the increment to the entropy rate function estimate for the $k^{th}$ logical link, $s_i^t$ is the current estimate of the entropy rate function for the $i^{th}$ virtual path, and $V_i^t(s)$ is the current estimate of the variance of the shifted distribution for the $i^{th}$ virtual path.

31. The virtual network dimensioning method of claim 1 wherein said step of determining the capacities to be allocated to each virtual link of each virtual network is performed using the following vector relationship:

$$C^k = \chi^k \cdot V^k$$

where $C^k$ is the capacity allocated to the $k^{th}$ virtual network, $\chi^k$ is the routing matrix and $V^k$ denotes the vector of the capacities allocated to the paths defined on the $k^{th}$ virtual network.

32. The virtual network dimensioning method of claim 5 wherein said partitioning scheme used to define the scope of resource sharing is a virtual link partitioning scheme, and wherein said virtual path dimensioning algorithm uses an entropy function as a blocking measure, said entropy blocking measure, $I_{U_j}(d_j)$ used to determine the capacity, $d_j$, of the $j^{th}$ virtual link being governed by the equation:

$$I_{U_j}(d_j) = q_j^{sup}(q_j d_j - \ln E(e^{q_j u_j}))$$

where $U_j$ is the offered traffic.

33. The virtual network dimensioning method of claim 5 wherein said partitioning scheme used to define the scope of resource sharing is a physical link partitioning scheme, and wherein said virtual path dimensioning algorithm uses an entropy function as a blocking measure, said entropy blocking measure, $I_{Z_i}(g_i)$, used to determine the capacity, $q_i$, of the $i^{th}$ physical link being governed by the equation:

$$I_{Z_i}(g_i) = q_i^{sup}(q_i g_i - \ln E(e^{q_i z_i})).$$

34. The virtual network dimensioning system of claim 13 wherein said means for transforming the dimensioning of said set of virtual networks to an equivalent task of dimensioning a set of modified virtual paths by collapsing said second and third layers of said multi-layer hierarchy to a new layer comprising a plurality of collapsed virtual paths further comprises the following:

means for deriving collapsed structure matrices for each of said collapsed virtual paths; and means for concatenating said collapsed structure matrices into a compiled structure matrix.

35. The virtual network dimensioning system of claim 34 wherein said collapsed structure matrix, $\Gamma^k$, for the $k^{th}$ collapsed virtual path is the Bool product of the Structure Matrix, $S^k$, and the Routing Matrix, $\chi^k$, said Bool Product being represented in mathematical notation by the equation:

$$\Gamma^k = S^k \otimes \chi^k.$$

36. The virtual network dimensioning system of claim 34 wherein said compiled structure matrix, $\Gamma_{phys}$, is obtained by concatenating its component collapsed structure matrices, $\Gamma^k$, using the relation:

$$\Gamma_{phys} = \underset{k=1,K}{concat}(\Gamma^k).$$

37. The virtual network dimensioning system of claim 13 wherein said virtual path dimensioning algorithm for allocating capacities to said collapsed virtual paths subject to said transmission capacity constraints of said plurality of logical links further comprises a pushdown algorithm (FIG. 9).

38. The virtual network dimensioning system of claim 13 wherein said virtual path dimensioning algorithm for allocating capacities to said collapsed virtual paths subject to said transmission capacity constraints of said plurality of logical links further comprises the following:

means for choosing an appropriate entropy rate function to model the load on each virtual path of said telecommunications network;

means for selecting an adaptive solution algorithm using the entropy rate function as a blocking measure that is operative to solve a load balancing problem for said general traffic; and means for performing computations on a computing system using said load balancing algorithm incorporating said entropy rate function to produce a load distribution on said virtual paths that is as uniform as possible.

39. The virtual network dimensioning system of claim 13 wherein said virtual path dimensioning algorithm for allocating capacities to said collapsed virtual paths uses the following linear approximation for $\Delta s_i$ to calculate the revised shift parameter estimate:

$$\Delta s_i^t = \frac{\Delta I_k^t}{s_i^t V_i^t(s)}$$

where $\Delta I_k^t$ is the increment to the entropy rate function estimate for the $k^{th}$ logical link, $s_i^t$ is the current estimate of the entropy rate function for the $i^{th}$ virtual path, and $V_i^t(s)$ is the current estimate of the variance of the shifted distribution for the $i^{th}$ virtual path.

40. The virtual network dimensioning system of claim 13 wherein said means for determining the capacities to be allocated to each virtual link of each virtual network further utilizes the following vector relationship:

$$C^k = \chi^k \cdot V^k$$

where $C^k$ is the capacity allocated to the $k^{th}$ virtual network, $\chi^k$ is the routing matrix and $V^k$ denotes the vector of the capacities allocated to the paths defined on the $k^{th}$ virtual network.

41. The virtual network dimensioning system of claim 17 wherein said partitioning scheme used to define the scope of resource sharing is a virtual link partitioning scheme, and wherein said virtual path dimensioning algorithm uses an entropy function as a blocking measure, said entropy blocking measure, $I_{U_j}(d_j)$ used to determine the capacity, $d_j$, of the $j^{th}$ virtual link being governed by the equation:

$$I_{U_j}(d_j) = q_j^{sup}(q_j d_j - \ln E(e^{q_j U_j}))$$

where $U_j$ is the offered traffic.

42. The virtual network dimensioning system of claim 17 wherein said partitioning scheme used to define the scope of resource sharing is a physical link partitioning scheme, and wherein said virtual path dimensioning algorithm uses an entropy function as a blocking measure, said entropy blocking measure, $I_{Z_i}(g_i)$, used to determine the capacity, $q_i$, of the $i^{th}$ physical link being governed by the equation:

$$I_{Z_i}(g_i) = q_i^{sup}(q_i g_i - \ln E(e^{q_i Z_i})).$$

* * * * *